United States Patent
Hareuveni et al.

(10) Patent No.: US 10,980,037 B2
(45) Date of Patent: Apr. 13, 2021

(54) APPARATUS, SYSTEM AND METHOD OF COMMUNICATION BY CO-LOCATED WIRELESS COMMUNICATION MODULES

(71) Applicant: INTEL IP CORPORATION, Santa Clara, CA (US)

(72) Inventors: Ofer Hareuveni, Haifa (IL); Itzik Shahar, Kadima (IL); Xuemei Ouyang, San Jose, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 16/362,666

(22) Filed: Mar. 24, 2019

(65) Prior Publication Data
US 2019/0223189 A1 Jul. 18, 2019

Related U.S. Application Data

(63) Continuation of application No. 14/748,545, filed on Jun. 24, 2015, now Pat. No. 10,244,546.

(51) Int. Cl.
*H04W 72/10* (2009.01)
*H04W 24/08* (2009.01)
(Continued)

(52) U.S. Cl.
CPC ......... *H04W 72/10* (2013.01); *H04L 47/2433* (2013.01); *H04L 47/283* (2013.01);
(Continued)

(58) Field of Classification Search
CPC . H04W 72/10; H04W 24/08; H04W 28/0257; H04L 47/2433; H04L 47/283
See application file for complete search history.

(56) References Cited

U.S. PATENT DOCUMENTS 7,054,330 B1 * 5/2006 Chou ............... H04L 47/50
370/444
8,121,144 B2 2/2012 Bitran
(Continued)

FOREIGN PATENT DOCUMENTS

CN 101690295 3/2010
EP 1729463 12/2006

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.
(Continued)

*Primary Examiner* — Donald L Mills
(74) *Attorney, Agent, or Firm* — Shichrur & Co.

(57) ABSTRACT

Some demonstrative embodiments include devices, systems and methods of communication by co-located wireless communication modules. For example, a device may be configured to receive a latency attribute indicating an allowed latency to transmit a packet using one or more shared resources shared between a plurality of wireless communication modules; receive a first priority level indicating a first transmission priority of the packet; increase the first priority level to a second priority level based on a comparison between the allowed latency and a time from reception of the latency attribute; and send the second priority level to an arbitration module, the second priority level to indicate to the arbitration module a second transmission priority to transmit the packet using the shared resources.

20 Claims, 7 Drawing Sheets

(51) Int. Cl.
*H04W 28/02* (2009.01)
*H04L 12/851* (2013.01)
*H04L 12/841* (2013.01)
*H04W 74/08* (2009.01)

(52) U.S. Cl.
CPC ....... *H04W 24/08* (2013.01); *H04W 28/0257* (2013.01); *H04W 74/08* (2013.01)

(56) References Cited

U.S. PATENT DOCUMENTS

| | | | |
|---|---|---|---|
| 8,755,477 | B1 | 6/2014 | Park et al. |
| 10,244,546 | B2 | 3/2019 | Hareuveni et al. |
| 2002/0136233 | A1 | 9/2002 | Chen et al. |
| 2003/0125019 | A1 | 7/2003 | Bajikar |
| 2004/0242159 | A1 | 12/2004 | Calderon et al. |
| 2005/0215284 | A1 | 9/2005 | Su et al. |
| 2007/0223430 | A1 | 9/2007 | Desai et al. |
| 2008/0049758 | A1 | 2/2008 | Hong et al. |
| 2008/0239960 | A1 | 10/2008 | Burckart et al. |
| 2008/0318630 | A1 | 12/2008 | Gil |
| 2009/0137206 | A1 | 5/2009 | Sherman et al. |
| 2012/0030357 | A1* | 2/2012 | Linsky ............ H04W 72/1215 709/226 |
| 2012/0033645 | A1 | 2/2012 | Mantravadi et al. |
| 2013/0034070 | A1 | 2/2013 | Seo et al. |
| 2014/0018115 | A1 | 1/2014 | Zhuang |
| 2014/0241376 | A1 | 8/2014 | Balkan et al. |
| 2016/0381692 | A1 | 12/2016 | Hareuveni et al. |

OTHER PUBLICATIONS

ETSI TS 136 300 V11.3.0 (Nov. 2012); LTE; Evolved Universal Terrestrial Radio Access (E-UTRA) and Evolved Universal Terrestrial Radio Access Network (E-UTRAN); Overall description; Stage 2 (3GPP TS 36.300 version 11.3.0 Release 11); Nov. 2012; 217 pages.
Bluetooth Specification Version 4.1, Specification of the Bluetooth System, Covered Core Package version: 4.1, Dec. 3, 2013, 2684 pages.
European Search Report for European Patent Application No. 16170239.4 dated Aug. 2, 2016, 6 pages.
Office Action for U.S. Appl. No. 14/748,545, dated Nov. 2, 2017, 16 pages.
Office Action for U.S. Appl. No. 14/748,545, dated Jun. 14, 2018, 7 pages.
Office Action for Chinese Patent Application No. 201610327757.0, dated Apr. 4, 2018, 5 pages.
Notice of Allowance for U.S. Appl. No. 14/748,545, dated Nov. 7, 2018, 11 Pages.
Office Action for Indian Patent Application No. 201644015240, dated Feb. 1, 2019, 6 pages.

* cited by examiner

APPARATUS, SYSTEM AND METHOD OF COMMUNICATION BY CO-LOCATED WIRELESS COMMUNICATION MODULES

TECHNICAL FIELD

Embodiments described herein generally relate to communication by co-located wireless communication modules.

BACKGROUND

Some wireless communication devices ("multi-radio devices"), for example, mobile devices, e.g., Smartphones, mobile computers, and the like, may include multiple co-located radios, which may be configured, for example, to communicate according to a plurality of radio technologies.

For example, a multi-radio device may include a Bluetooth (BT) radio, a cellular radio, a Wireless Fidelity (WiFi) radio, e.g., a Wireless Local Area Network (WLAN) radio, and/or any other radio.

Two or more radios of the multi-radio device may utilize one or more shared resources. For example, the BT radio may use the same antenna, the same transmitter, and/or the same medium, as the WLAN radio. As a result, communications performed by the radios of the multi-radio device may interfere with one another.

Coordinating between transmissions of the plurality of radio technologies may be a complex task, as each radio technology may have different requirements and/or may impose different constraints.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
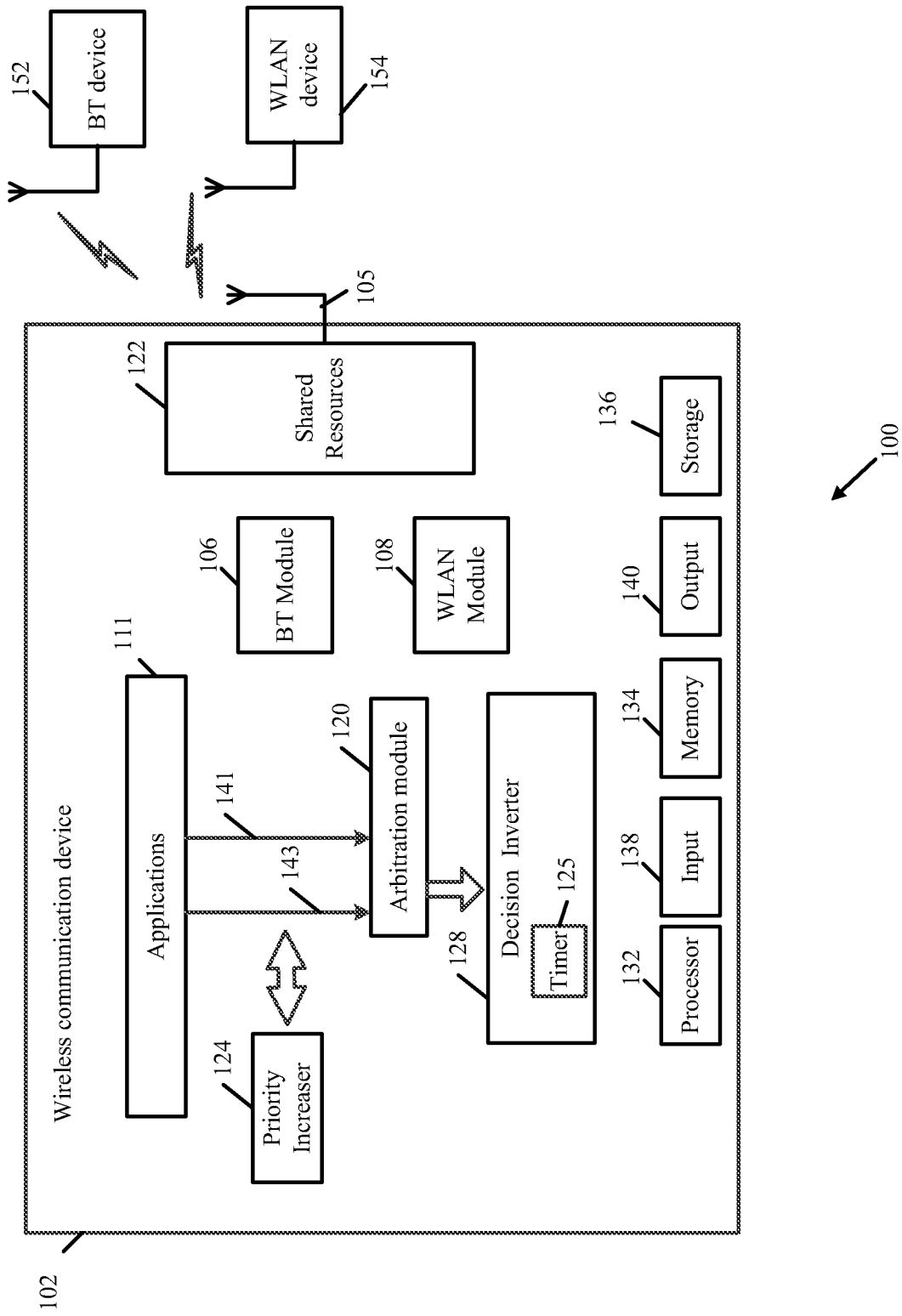
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Bluetooth standards ("the Bluetooth Standards"), e.g., including *Bluetooth specification* V 1.0, Dec. 1, 1991, *Bluetooth specification* V 4.1, Dec. 3, 2013, and/or future versions and/or derivatives thereof, devices and/or networks operating in accordance with existing IEEE 802.11 standards (IEEE 802.11-2012, *IEEE Standard for Information technology—Telecommunications and information exchange between systems Local and metropolitan area networks—Specific requirements Part* 11: *Wireless LAN Medium Access Control (MAC) and Physical Layer (PHY) Specifications*, Mar. 29, 2012; *IEEE*802.11ac-2013 ("*IEEE*

P802.11ac-2013, *IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz*", December 2013); IEEE 802.11ad ("IEEE P802.11ad-2012, *IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band*", 28 Dec. 2012); *IEEE 802.11 task group ai (TGai)*) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version* 1.1, April 2011, Final specification) and/or future versions and/or derivatives thereof, devices and/or networks operating in accordance with existing Wireless Fidelity (WiFi) Alliance (WFA) Peer-to-Peer (P2P) specifications (*WiFi P2P technical specification*, version 1.2, 2012) and/or future versions and/or derivatives thereof, devices and/or networks operating in accordance with existing cellular specifications and/or protocols, e.g., 3rd Generation Partnership Project (3GPP), 3GPP Long Term Evolution (LTE) ("the LTE Standards) (including ETSI TS 136 300 V11.3.0 (2012 December): *LTE; Evolved Universal Terrestrial Radio Access* (E-UTRA) *and Evolved Universal Terrestrial Radio Access Network* (E-UTRAN); *Overall description; Stage* 2 (3 GPP TS 36.300 version 11.3.0 Release 11), 2012), and/or future versions and/or derivatives thereof, units and/or devices which are part of the above networks, and the like.

Some embodiments may be used in conjunction with one way and/or two-way radio communication systems, multi-radio devices, cellular radio-telephone communication systems, multi-radio communication systems, Bluetooth communication systems, a User Equipment (UE), a mobile device, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, a Mobile Internet Device (MID), or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), Single Carrier Frequency-Division Multiple Access (SC-FDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), BT, BLE, Wi-Fi, Wi-Max, ZigBee™, Ultra-Wideband (UWB), Global System for Mobile communication (GSM), 2 G, 2.5 G, 3 G, 3.5 G, 4 G, Fifth Generation (5 G) mobile networks, 3GPP, Long Term Evolution (LTE), LTE advanced, High-Speed Downlink Packet Access (HSDPA), High-Speed Uplink Packet Access (HSUPA), High-Speed Packet Access (HSPA), HSPA+, Single Carrier Radio Transmission Technology (1×RTT), Evolution-Data Optimized (EV-DO), Enhanced Data rates for GSM Evolution (EDGE), and the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit. The verb "communicating" may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a Wireless Fidelity (WiFi) network, or a WLAN according to the IEEE 802 Standards (also referred to as "the 802 network"). Other embodiments may be used in conjunction with any other suitable wireless communication network, for example, a wireless area network, a "piconet", a WPAN, a WVAN and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Reference is now made to FIG. 1, which schematically illustrates a block diagram of a system 100, in accordance with some demonstrative embodiments.

In some demonstrative embodiments, system 100 may include a wireless communication device 102 configured to communicate with one or more wireless communication devices of one or more wireless communication networks.

In some demonstrative embodiments, device 102 may include a plurality of co-located wireless communication modules.

In some demonstrative embodiments, a wireless communication module may communicate according to a wireless communication technology and/or a wireless communication protocol.

For example, the wireless communication module may communicate according to a WLAN technology, a BT technology, a cellular technology, e.g., an LTE technology, and/or any other technology.

In some demonstrative embodiments, device 102 may include at least a first wireless communication module 106 and a second wireless communication module 108.

In some demonstrative embodiments, first wireless communication module 106 may include a Bluetooth (BT) module 106 configured to communicate with at least one BT device 152 of a BT wireless communication network, e.g., according to a secure BT communication protocol, a BLE communication protocol, and/or any other BT communication protocol.

In some demonstrative embodiments, second wireless communication module 108 may include a WLAN module 108, for example, a Wireless Fidelity (WiFi) or any other WLAN module, to communicate with at least one WLAN device 154 of a WLAN. For example, WLAN module 108 may be configured to communicate with WLAN device 154 over a Wireless Fidelity (WiFi) link, a Point to Point (P2P) link, a WiFi Direct (WFD) link, a Wireless Gigabit (WiGig) link, or any other link.

In some demonstrative embodiments, modules 106 and/or 108 may include any other modules, e.g., different from WLAN module and/or BT module.

In some demonstrative embodiments, wireless communication device 102 may include any other additional or alternative module configured to communicate with any other wireless communication device, for example, a cellular module, e.g., an LTE module.

Some embodiments are described herein with respect to a device, e.g., wireless communication device 102, including two wireless communication modules, e.g., BT module 106 and WLAN module 108. However, in other embodiments, the device may include any other number of modules, e.g., three modules or more than three modules. In one example, the device may include two modules, e.g., a WLAN module and a BT module, and/or any other combination of modules. In another example, the multi-module device may include more than three modules, e.g., including one or more cellular modules, one or more BT modules, one or more WLAN modules, one or more Mobile Wireless Standards (MWS) modules, and/or any other modules.

In some demonstrative embodiments, modules 106 and/or 108 may include one or more radios, e.g., at least one radio per module.

In some demonstrative embodiments, modules 106 and/or 108 may share one or more radios, e.g., one or more radios may be shared between modules 106 and/or 108.

In some demonstrative embodiments, modules 106 and/or 108 may include, for example, one or more wireless transmitters, receivers and/or transceivers including circuitry and/or logic able to send and/or receive wireless communication signals, RF signals, frames, blocks, transmission streams, packets, messages, data items, and/or data. In one example, modules 106 and/or 108 may include circuitry and/or logic, modulation circuitry and/or logic, demodulation circuitry and/or logic, amplifiers, analog to digital and digital to analog converters, filters, and/or the like.

In some demonstrative embodiments, modules 106 and/or 108 may include or may be implemented as part of one or more wireless Network Interface Cards (NICs), and the like.

In one example, modules 106 and/or 108 may be implemented as part of a single NIC, e.g., capable of providing WLAN and BT communication functionalities. In another example, modules 106 and/or 108 may be implemented by two or more separate NICs.

In some demonstrative embodiments, modules 106 and/or 108 may include, or may be associated with, one or more antennas 105, e.g., two or more antennas.

In some demonstrative embodiments, antennas 105 may include any type of antennas suitable for transmitting and/or receiving wireless communication signals, blocks, frames, transmission streams, packets, messages and/or data. For example, antennas 105 may include any suitable configuration, structure and/or arrangement of one or more antenna elements, components, units, assemblies and/or arrays. For example, antennas 105 may include a phased array antenna, a dipole antenna, a single element antenna, a set of switched beam antennas, and/or the like.

In some embodiments, antennas 105 may implement transmit and receive functionalities using separate transmit and receive antenna elements. In some embodiments, antennas 105 may implement transmit and receive functionalities using common and/or integrated transmit/receive elements.

In some demonstrative embodiments, modules 106 and 108 may utilize one or more separate antenna elements.

In some demonstrative embodiments, modules 106 and 108 may utilize one or more shared antenna elements.

In some demonstrative embodiments, wireless communication device 102 may include or may be implemented as part a mobile device, for example, a User Equipment (UE), a Mobile Device (MD), a mobile Station (STA), a Subscriber Station (SS), a Mobile Unit (MU), a mobile computer, a laptop computer, an Ultrabook™ computer, a notebook computer, a tablet computer, a handheld computer, a handheld device, a BT device, a BLE device, a cellular device, a cellular phone, a Smartphone, a PDA device, a handheld PDA device, an on-board device, an off-board device, a consumer device, a vehicular device, a non-vehicular device, a PCS device, a PDA device which incorporates a wireless communication device, a mobile or portable GPS device, a relatively small computing device, a non-desktop computer, a "Carry Small Live Large" (CSLL) device, an Ultra Mobile Device (UMD), an Ultra Mobile PC (UMPC), an "Origami" device or computing device, a device that supports Dynamically Composable Computing (DCC), a context-aware device, a video device, an audio device, an A/V device, a BD player, a BD recorder, a DVD player, a HD DVD player, a DVD recorder, a HD DVD recorder, a PVR, a broadcast HD receiver, a video sink, an audio sink, a stereo tuner, a broadcast radio receiver, a flat panel display, a PMP, a DVC, a digital audio player, a speaker, an audio receiver, a gaming device, an audio amplifier, a data source, a data sink, a DSC, a media player, a television, a music player, or the like. In other demonstrative embodiments, wireless communication device 102 may include a static or non-portable device, for example, a non-mobile computing device, a desktop computer, a non-portable consumer device, a communication node, a communication station, or the like.

In some demonstrative embodiments, wireless communication device 102 may include, for example, one or more of a processor 132, an input unit 138, an output unit 140, a memory unit 134, and/or a storage unit 136. Wireless communication device 102 may optionally include other suitable hardware components and/or software components. In some demonstrative embodiments, some or all of the components of wireless communication device 102 may be enclosed in a common housing or packaging, and may be interconnected or operably associated using one or more wired or wireless links. In other embodiments, components of one or more of wireless communication device 102 may be distributed among multiple or separate devices.

Processor 132 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 132 executes instructions, for example, of an Operating System (OS) of wireless communication device 102 and/or of one or more suitable applications.

Input unit 138 includes, for example, a keyboard, a keypad, a mouse, a touch-screen, a touch-pad, a track-ball, a stylus, a microphone, or other suitable pointing device or input device. Output unit 140 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

Memory unit 134 includes, for example, a Random Access Memory (RAM), a Read Only Memory (ROM), a Dynamic RAM (DRAM), a Synchronous DRAM (SDRAM), a flash memory, a volatile memory, a non-volatile memory, a cache memory, a buffer, a short term memory unit, a long term memory unit, or other suitable memory units. Storage unit 136 includes, for example, a hard disk drive, a floppy disk drive, a Compact Disk (CD) drive, a CD-ROM drive, a DVD drive, or other suitable removable or non-removable storage units. Memory unit 134 and/or storage unit 136, for example, may store data processed by wireless communication device 102.

In some demonstrative embodiments, device 102 may include one or more hosts, services, and/or applications 111.

In some demonstrative embodiments, applications 111 may communicate one or more packets by BT module 106 and/or WLAN module 108. For example, device 102 may communicate one or more packets between device 102, and devices 152 and/or 154.

In some demonstrative embodiments, the packets may include data packets, control packets, management packets, and/or any other packet and/or frame.

In some demonstrative embodiments, a first application of applications 111 may request to transmit a first packet 141 using BT module 106, for example, to BT device 152; and/or a second application of applications 111 may request to transmit a second packet 143 using WLAN module 108, for example, to WLAN device 154.

In some demonstrative embodiments, the requests to transmit packet 141 and 143 may be generated substantially concurrently.

In some demonstrative embodiments, modules 106 and 108 may use one or more shared resources 122, e.g., shared between modules 106 and 108.

In some demonstrative embodiments, shared resources 122 may include radio resources, hardware resources, media resources, medium resources, storage resources, a spectrum, and/or the like, which may be used to transmit packets 141 and/or 143.

In one example, modules 106 and 108 may share the same antenna, e.g., antennas 105, the same frequency spectrum, and/or the same wireless medium. According to this example, shared resources 122 may include antennas 105, the frequency spectrum and/or the wireless medium.

In another example, modules 106 and 108 may share one or more radio resources. For example, BT module 106 and/or WLAN module 108 may share a radio, a transmitter, a transceiver, and/or an amplifier, of device 102.

In some demonstrative embodiments, the concurrent requests to transmit packets 141 and 143 may result in a contention between packets 141 and 143.

In some demonstrative embodiments, device 102 may include an arbitration module 120 configured to manage, control and/or prioritize access to shared resources 122, for example, to mitigate and/or to reduce contentions between transmissions by modules 106 and 108.

In one example, arbitration module 120 may include a Packet Level Arbitration (PTA) circuitry, module, logic, and/or integrated circuit.

In some demonstrative embodiments, applications 111 may assign a first priority to packet 141 to indicate a first transmission priority of packet 141.

In some demonstrative embodiments, applications 111 may support assignment of a priority level for an IP packet, for example, according to a QoS requirement.

In some demonstrative embodiments, the priority level may be assigned by upper layers of a protocol stack, e.g., a layer 3 ("L3") and/or above.

In some demonstrative embodiments, one or more modules of MAC and/or PHY layers, e.g., layers 1 and 2, (L2 and L1), for example, arbitration module 120, may use the priority level for arbitration decisions between the co-located wireless communication modules, e.g., as described below.

In some demonstrative embodiments, the first priority of packet 141 may include a Bluetooth profile.

In one example, the first priority of packet 141 may include additional priorities, e.g., corresponding to multi profile scenarios, for example, having a different valid packet lifetime. For example, when a BT device, e.g., a car speaker, is connected to multiple devices, e.g., the car radio, and a tablet.

In some demonstrative embodiments, applications 111 may assign a first priority to packet 143 to indicate a first transmission priority of packet 143.

In some demonstrative embodiments, the first priority of packet 141 may include a Quality of Service (QoS) level.

In one example, the first priority of packet 143 may include criticality of management frames and/or control frames configured to maintain connection and/or to regulate a media access.

In some demonstrative embodiments, the first priorities of packets 141 and 143 may include a single bit value, for example, to represent a priority level selected from two priority levels, e.g., a low priority and a high priority.

In some demonstrative embodiments, the first priorities of packets 141 and 143 may include a multi-bit value ("word"), for example, to represent a priority level selected from more than two priority levels.

In one example, the multi-bit word may represent four levels of QoS, e.g., in accordance with an IEEE802.11 Specification. For example, the first priority of packet 143 may include a QoS level of the four QoS levels.

In another example, the multi-bit word may represent a BT profile of a plurality of BT profiles, e.g., in accordance with a BT Specification. For example, the first priority of packet 141 may include a BT profile of the plurality of BT profiles.

In some demonstrative embodiments, one or more BT profiles may correspond to a QoS level, e.g., if a BT profile requires a certain QoS level.

In some demonstrative embodiments, arbitration module 120 may be configured to decide which module of modules 106 and 108 receives access to shared resources 122, for example based on the priorities of packets 141 and 143. As a result, arbitration module 120 may be configured to decide which packet of packets 141 and 143 may be transmitted, for example, using shared resources 122.

In some demonstrative embodiments, a scheme to decide which packet of packets 141 and 143 may be transmitted, for example, based only on the priorities of packets 141 and 143, may not be effective and/or efficient.

In one example, such a scheme may result in a long-term starvation of modules 106 and/or 108, for example, if a plurality of conflicts occurs between modules 106 and 108.

For example, modules 106 and 108 may share antennas 105 between modules 106 and 108, for example, to communicate with a BT earphone, e.g., device 152, and to have a voice over IP (VoIP) call with another device, e.g., device 154. According to this example, data packets between BT module 106 and the BT earphone may coincide with dada packets of the call between WLAN module 108 and the other device, for example, if a user of device 102 makes a VoIP call and uses the BT earphone for the call. The data packets having the higher priority, e.g., the data packets between BT module 106 and the BT earphone, may repeatedly grant access to module 106, which may result in a starvation of module 108.

In another example, a module having the lower priority level may be disconnected from other devices, for example, as a result of inability to communicate one or more control or management frames; may suffer from interruption of communication for long sequences of a consecutive frame exchange; and/or may have degradation of performance, for example, as a result from intensive rate scaling of peer devices, e.g., in attempt to improve frame exchange between the device and the other devices.

In another example, this scheme may not be aware of an urgency to transmit a data packet to an other device, for example, if the urgency changes between a first transmission attempt and one or more consecutive re-transmission attempts, e.g., if the first transmission attempt is deferred or failed, for example, as a result of non-availability of one or more of shared resources 122, and/or a failure to get acknowledge from the other device.

For example, one or more applications, for example, VoIP applications, video streaming applications, and/or any other low latency applications, may be required to meet a short period of latency, e.g., 20 milliseconds (ms). According to this example, a quality of a voice call of a VoIP application may be significantly degraded, e.g., a user may hear unpleasant impulse noise like strong ticks and/or may loose a portion of the voice call, for example, if the VoIP application does not successfully transmit packets of the voice call within the latency.

In some demonstrative embodiments, device 102 may implement a scheme ("the first scheme"), to determine whether or not to increase a priority of a packet, for example, based on a latency, e.g., as described below.

In some demonstrative embodiments the first scheme may enable, for example, a module to increase a probability of a packet to receive an access to a shared resource to transmit the packet, for example, if a pending time to transmit the packet is close to expiration.

In some demonstrative embodiments, the first scheme may provide, for example, an improvement, e.g., a significant improvement, for example, at least in the quality of service of one or more applications, e.g., as described below.

In some demonstrative embodiments, device 102 may implement a scheme ("the second scheme"), to determine whether or not to invert a decision of arbitration module 120, e.g., as described below.

In some demonstrative embodiments, the second scheme may provide, for example, at least dynamic re-prioritization of packets of two or more co-located modules, e.g., modules 106 and/or 108.

In some demonstrative embodiments, the second scheme may implement, for example, a swap, e.g., a statistical swap, of static arbitration decisions of arbitration module 120, for example, in a case of a contention between the two or more co-located modules.

In some demonstrative embodiments, the swap may be based on a configurable statistical win ratio, and/or a swap of arbitration decision based on a pre-configured sequence of swap or no-swap decisions, e.g., as described below.

In some demonstrative embodiments, device 102 may implement only the first scheme, for example, while not implementing the second scheme.

In some demonstrative embodiments, device 102 may implement only the second scheme, for example, while not implementing the first scheme.

In some demonstrative embodiments, device 102 may implement both the first and second schemes.

In some demonstrative embodiments, device 102 may include a priority increaser 124 configured to increase a priority of a packet to be transmitted.

In some demonstrative embodiments, priority increaser 124 may be configured, for example, in accordance with the first scheme, e.g., to increase a priority of a packet, for example, if the pending time to transmit the packet is close to expiration, e.g., as describe below.

In some demonstrative embodiments, priority increaser 124 may include circuitry and/or logic, e.g., processor circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of priority increaser 124, respectively. Additionally or alternatively, one or more functionalities of priority increaser 124 may be implemented by logic, which may be executed by a machine and/or one or more processors, e.g., as described below.

In one example, priority increaser 124 may include circuitry and/or logic, for example, one or more processors including circuitry and/or logic, to cause, to trigger, to initiate, to request, and/or to instruct a wireless device, e.g., device 102, and/or a wireless station, e.g., a wireless STA implemented by device 102, to perform one or more operations, communications and/or functionalities, e.g., as described herein.

In some demonstrative embodiments, priority increaser 124 may be implemented as a MAC layer logic and/or circuitry, a logic, a circuitry, an application, a software, and/or a firmware.

Some demonstrative embodiments may enable device 102 to assign a latency attribute indicating an allowed latency of a packet to be transmitted via the shared resources.

In some demonstrative embodiments, a value of the latency attribute may be measured in time units, e.g., milliseconds.

In some demonstrative embodiments, the value of the latency attribute may be provided by an application that provides and/or generates the packet, e.g., applications 111, and may be provided and/or sent to a networking stack of device 102, for example, as a meta-data and/or by any other scheme.

In other embodiments, the value of the latency attribute may include any other value and/or may be generated and/or provided in any other form.

In some demonstrative embodiments, priority increaser 124 may use the value of the latency attribute as an initial value, and may implement a timer to count down the initial value, for example, until expiration or successful transmission of the packet, e.g., as described below.

In some demonstrative embodiments, based on a current value of the timer, e.g., before the packet is transmitted, priority increaser 124 may determine an arbitration priority of the packet to be transmitted, for example, based on a remaining time to expiration of the timer, e.g., as described below.

In some demonstrative embodiments, priority increaser 124 may consider a transmission rate of the packet and/or a frame length of the packet, and/or may determine an expected time to receive an acknowledge from a receiving side of the packet.

In some demonstrative embodiments, priority increaser 124 may use the expected time to receive the acknowledge, the allowed latency of the packet, the remaining time to expiration of the packet, and/or any other parameter or attribute to determine the arbitration priority of the packet for arbitration with a co-located transmitter.

In some demonstrative embodiments, priority increaser 124 may receive a latency attribute indicating an allowed latency to transmit a packet using one or more shared resources shared between modules 106 and 108.

In one example, priority increaser 124 may receive a latency attribute indicating an allowed latency to transmit packet 143 using shared resources 122.

In some demonstrative embodiments, the latency attribute of packet 143 may include a Requested Max Latency (RML) attribute to indicate a maximal latency to transmit packet 143.

In some demonstrative embodiments, priority increaser 124 may receive the latency attribute of packet 143, for example, from applications 111.

In some demonstrative embodiments, priority increaser 124 may receive additional information of packet 143, e.g., in addition to the latency attribute of packet 143.

In some demonstrative embodiments, priority increaser 124 may receive a first priority level indicating a first transmission priority of the packet 143.

In one example, priority increaser 124 may receive the first priority level of packet 143 from applications 111.

In some demonstrative embodiments, priority increaser 124 may increase the first priority level of packet 143 to a second priority level, for example, based on a comparison between the allowed latency of packet 143 and a time from reception of the latency attribute.

In some demonstrative embodiments, priority increaser 124 may provide and/or send the second priority level of packet 143 to arbitration module 120.

In some demonstrative embodiments, the second priority level may indicate to arbitration module 120 a second transmission priority to transmit packet 143 using shared resources 122.

In some demonstrative embodiments, arbitration module 120 may receive the second priority level of packet 143, and may decide which packet of packets 141 and 143 is to be transmitted, for example, based on the second priority level of packet 143.

In some demonstrative embodiments, priority increaser 124 may increase the priority of packet 143, for example, based on a remaining time for expiration of the allowed latency of packet 143.

In some demonstrative embodiments, priority increaser 124 may include a timer 125 to count down from the allowed latency of packet 143.

In some demonstrative embodiments, timer 125 may be implemented as part of priority increaser 124.

In other embodiments, timer 125 may be implemented as part of another element of device 102, e.g., separate from priority increaser 124.

In some demonstrative embodiments, timer 125 may include a software timer, a Hardware timer, a circuitry, a logic, a Firmware timer, and/or any other suitable timer.

In some demonstrative embodiments, priority increaser 124 may set timer 125 to count down from the allowed latency of packet 143.

In some demonstrative embodiments, priority increaser 124 may increase the first priority level of packet 143, for example, based on a value of timer 125.

In some demonstrative embodiments, priority increaser 124 may increase the priority level of packet 143, for example, based on a comparison between a predefined threshold and a difference between the allowed latency of packet 143 and the time from reception of the latency attribute of packet 143.

In some demonstrative embodiments, priority increaser 124 may be configured to increase the priority level of one or more other packets, e.g., packet 141.

In some demonstrative embodiments, priority increaser 124 may receive a latency attribute indicating an allowed latency to transmit packet 141 using shared resources 122.

In some demonstrative embodiments, priority increaser 124 may receive the latency attribute of packet 141, for example, from applications 111.

In some demonstrative embodiments, priority increaser 124 may increase the priority level of packet 141 to a second priory level of packet 141, for example, based on a comparison between a predefined threshold and a difference between the allowed latency of packet 141 and the time from reception of the latency attribute of packet 141.

In one example, priority increaser 124 may receive packet 141 having a second level of priority, e.g., out of four priority levels, when the fourth priority level has the higher priority, and a latency attribute indicating an allowed latency of 20 ms. Priority increaser 124 may receive packet 143, having a third level of priority and a latency attribute indicating an allowed latency of 70 ms. The predefined threshold to increase the second priority level to the third priority level may be 15 ms, and the predefined threshold to increase the third priority level to the fourth priority level may be 5 ms.

According to this example, arbitration module 102 may decide to transmit packet 143 and one or more additional packets 143, while packet 141 is pending transmission, for example, as long as a remaining time to transmit packet 141 is greater than 5 ms, e.g., since the priority of packets 143 is higher than the priority of packet 141. Arbitration module 102 may decide to transmit packet 143, for example, if the remaining time to transmit packet 141 is less than 5 ms. For example, the priority level of packet 141 may be increased to the fourth level, and packets 143 may be at the third priority level.

Figure 2:
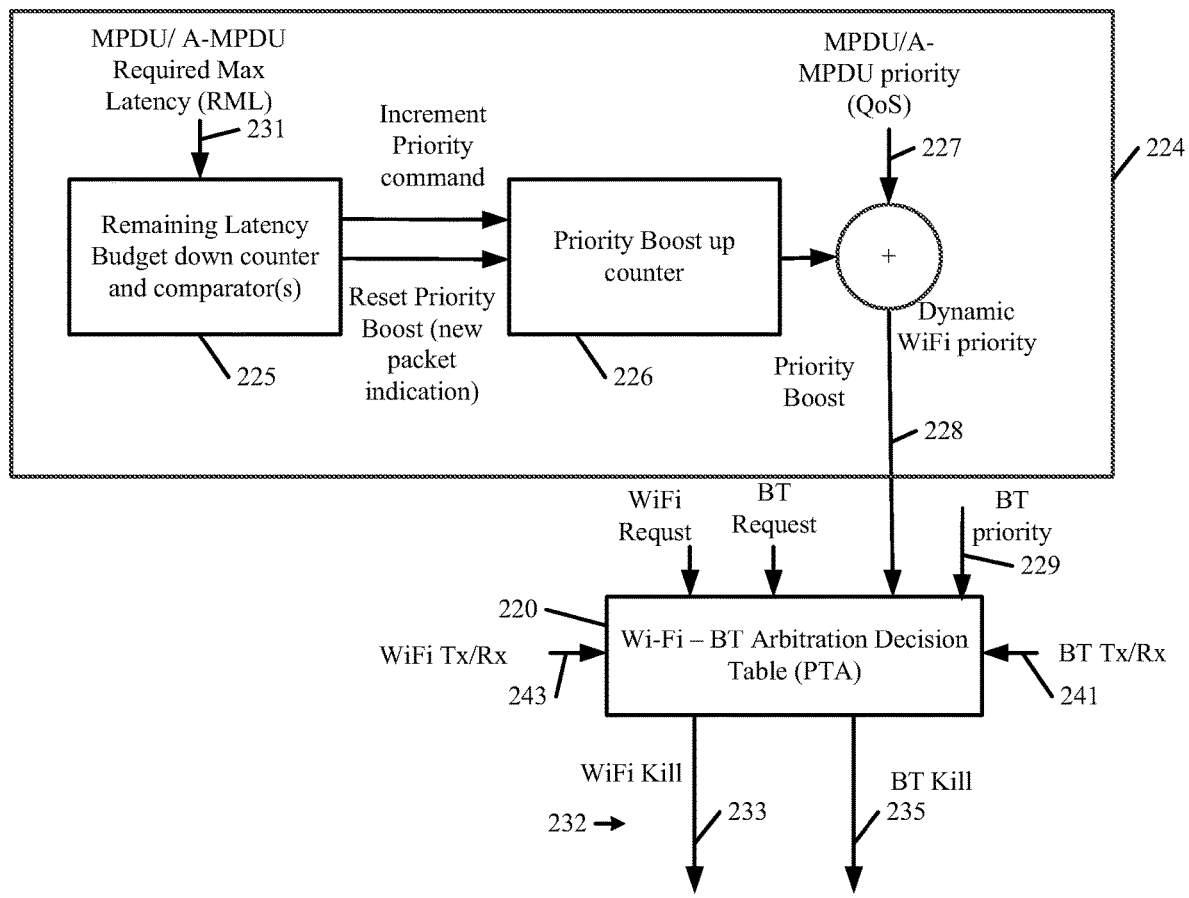
FIG. 2 is a schematic illustration of a priority increaser and an arbitration module, in accordance with some demonstrative embodiments.

Reference is made to FIG. 2, which schematically illustrates a priority increaser 224 and an arbitration module 220, in accordance with some demonstrative embodiments. For example, arbitration module 220 may perform the functionality of arbitration module 120 (FIG. 1), and/or priority increaser 224 may perform the functionality of priority increaser 124 (FIG. 1).

As shown in FIG. 2, priority increaser 224 may include a timer 225 to receive a latency attribute 231, e.g., the RML, to indicate an allowed latency to transmit a packet 243, and to count down from the allowed latency of packet 243. For example, timer 225 may perform the functionality of timer 125 (FIG. 1).

As shown in FIG. 2, priority increaser 224 may include an increment module 226 configured to increment a priority of packet 243, e.g., by one level.

As shown in FIG. 2, priority increaser 224 may receive a first priority level 227 of packet 243, e.g., from applications 111 (FIG. 1).

As shown in FIG. 2, priority increaser 224 may increase first priority level 227 to a second priority level 228, for example, based on a comparison between the allowed latency of packet 243 and a time from reception of latency attribute 231, e.g., as described above.

As shown in FIG. 2, priority increaser 224 may provide and/or send second priority level 228 to arbitration module 220.

As shown in FIG. 2, arbitration module 220 may receive another priority level 229 of another packet 241, e.g., from applications 111 (FIG. 1).

In some demonstrative embodiments, arbitration module 220 may provide and/or send at least one decision signal 232 indicating which packet of packets 241 and 243 is selected to be transmitted.

As shown in FIG. 2, the at least one decision signal 232 may include a first signal 233 and a second signal 235.

In some demonstrative embodiments, the first signal 233 may include a first value to indicate whether or not the packet 243 is to be differed, e.g., killed and/or declined, and the second signal 235 may include a second value to indicate whether or not packet 241 is to be differed.

In some demonstrative embodiments, another priority increaser may be implemented, e.g., in addition to or instead of priority increaser 228, for example, to increase the priority level 229 of packet 241. For example, another priority increaser may have a functionality similar to the functionality of priority increaser 224.

Figure 3:
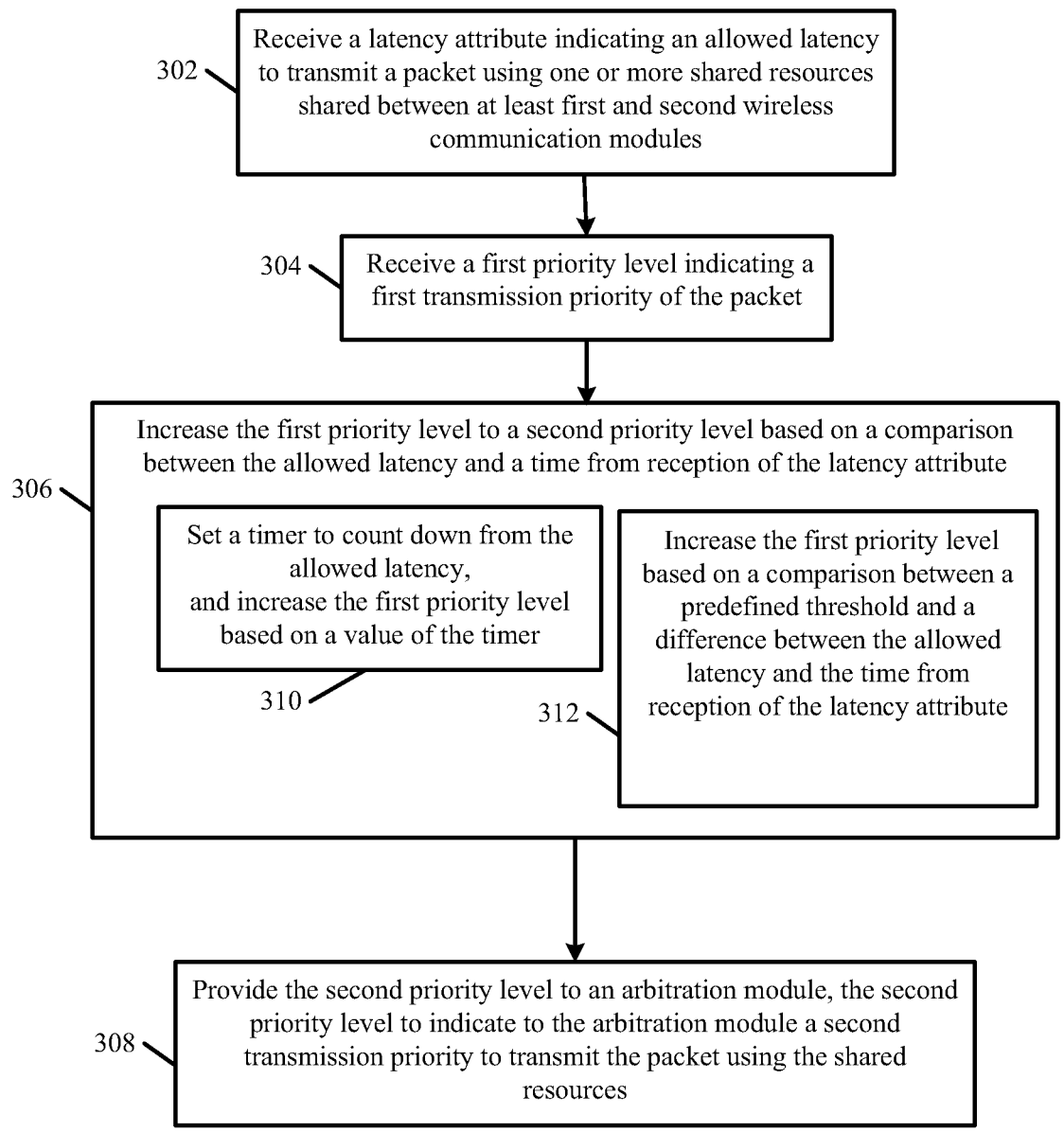
FIG. 3 is a schematic flow-chart illustration of a method of increasing a priority of a packet, in accordance with some demonstrative embodiments.

Reference is made to FIG. 3, which schematically illustrates a method of increasing a priority of a packet, in accordance with some demonstrative embodiments. In some demonstrative embodiments, one or more of the operations of the method of FIG. 3 may be performed by one or more elements of a system, e.g., system 100 (FIG. 1), a multi-radio device, e.g., wireless communication device 102 (FIG. 1), and/or a priority increaser, e.g., priority increaser 124 (FIG. 1).

As indicated at block 302, the method may include receiving a latency attribute indicating an allowed latency to transmit a packet using one or more shared resources shared between at least first and second co-located wireless communication modules. For example, priority increaser 124 (FIG. 1) may receive the latency attribute indicating the allowed latency to transmit packet 143 (FIG. 1), using one or more shared resources 122 (FIG. 1) shared between at least modules 106 and 108 (FIG. 1), e.g., as described above.

As indicated at block 304, the method may include receiving a first priority level indicating a first transmission priority of the packet. For example, priority increaser 124 (FIG. 1) may receive the first priority level of packet 143 (FIG. 1) indicating a first transmission priority of packet 143 (FIG. 1); and/or priority increaser 224 (FIG. 2) may receive the first priority level 227 (FIG. 2) of packet 243 (FIG. 2) indicating a first transmission priority of packet 243 (FIG. 2), e.g., as described above.

As indicated at block 306, the method may include increasing the first priority level to a second priority level, for example, based on a comparison between the allowed latency and a time from reception of the latency attribute. For example, priority increaser 124 (FIG. 1) may increase the first priority level of packet 143 (FIG. 1) to the second priority level of packet 143 (FIG. 1), for example, at least based on a comparison between the allowed latency of packet 143 (FIG. 1) and the time from reception of the latency attribute of packet 143 (FIG. 1); and/or priority increaser 224 (FIG. 1) may increase the first priority level of packet 243 (FIG. 2) to the second priority level 228 (FIG. 2) of packet 243 (FIG. 2), for example, at least based on a comparison between the allowed latency of packet 243 (FIG. 2) and the time from reception of the latency attribute of packet 243 (FIG. 2), e.g., as described above.

As indicated at block 308, the method may include providing and/or sending the second priority level to an arbitration module, the second priority level to indicate to the arbitration module a second transmission priority to transmit the packet using the shared resources. For example, priority increaser 124 (FIG. 1) may provide and/or send the second priority level of packet 143 (FIG. 1) to arbitration module 120 (FIG. 1), the second priority level may indicate to arbitration module 120 (FIG. 1) the second transmission priority to transmit packet 143 (FIG. 1) using shared resources 122 (FIG. 1); and/or priority increaser 224 (FIG. 2) may provide and/or send the second priority level 228 (FIG. 2) of packet 243 (FIG. 2) to arbitration module 220 (FIG. 2), the second priority level may indicate to arbitration module 220 (FIG. 2) the second transmission priority to transmit packet 243 (FIG. 2), e.g., as described above.

As indicated at block 310, increasing the first priority level may include setting a timer to count down from the allowed latency, and increasing the first priority level based at least on a value of the timer. For example, priority increaser 124 (FIG. 1) may set timer 125 (FIG. 1) to count down from the allowed latency of packet 143 (FIG. 1), and may increase the first priority level of packet 143 (FIG. 1), for example, based at least on the value of the timer 125 (FIG. 1); and/or priority increaser 224 (FIG. 2) may set timer 225 (FIG. 2) to count down from the allowed latency of packet 243 (FIG. 2), and may increase the first priority level of packet 243 (FIG. 2), for example, based at least on the value of the timer 225 (FIG. 2), e.g., as described above.

As indicated at block 312, increasing the first priority level may include increasing the first priority level based at least on a comparison between a predefined threshold and a difference between the allowed latency and the time from reception of the latency attribute. For example, priority increaser 124 (FIG. 1) may increase the first priority level of packet 143 (FIG. 1), for example, based at least on the predefined threshold and the difference between the allowed latency of packet 143 (FIG. 1) and the time from reception of the latency attribute of packet 143 (FIG. 1); and/or priority increaser 224 (FIG. 1) may increase the first priority level 227 (FIG. 2), for example, based at least on the predefined threshold and the difference between the allowed latency of packet 243 (FIG. 2) and the time from reception of the latency attribute of packet 243 (FIG. 2), e.g., as described above.

Referring back to FIG. 1, in some demonstrative embodiments, device 102 may include a decision inverter 128 configured to implement dynamic re-prioritization of packets of modules 106 and 108.

In some demonstrative embodiments, decision inverter 128 may be configured to implement the second scheme.

In some demonstrative embodiments, the dynamic re-prioritization of packets of modules 106 and 108 may implement a swap, e.g., a statistical swap, of static arbitration decisions of arbitrations module 122, for example, in a case of a contention between the two or more co-located wireless communication modules, e.g., as descried below.

In some demonstrative embodiments, decision inverter 128 may be configured to selectively invert decisions of arbitration module 122.

In some demonstrative embodiments, decision inverter 128 may include circuitry and/or logic, e.g., processor circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of decision inverter 128, respectively. Additionally or alternatively, one or more functionalities of decision inverter 128 may be implemented by logic, which may be executed by a machine and/or one or more processors, e.g., as described below.

In one example, decision inverter 128 may include circuitry and/or logic, for example, one or more processors including circuitry and/or logic, to cause, to trigger, to initiate, to request, and/or to instruct a wireless device, e.g., device 102, and/or a wireless station, e.g., a wireless STA implemented by device 102, to perform one or more operations, communications and/or functionalities, e.g., as described herein.

In some demonstrative embodiments, decision inverter 128 may receive the first priority level of packet 141, e.g., as described above.

In some demonstrative embodiments, decision inverter 128 may receive the first priority level of packet 143, e.g., as described above.

In some demonstrative embodiments, decision inverter 128 may receive the at least one decision signal indicating packet 143 is selected, e.g., from packets 141 and 143, to be transmitted using the one or more shared resources 122.

In some demonstrative embodiments, decision inverter 128 may receive the decision signal from arbitration module 120.

In one example, decision inverter 128 may receive from arbitration module 102 the decision signal 232 (FIG. 2), e.g., indicating packet 241 (FIG. 2) is to be differed, and packet 243 (FIG. 2) is to be transmitted.

In some demonstrative embodiments, decision inverter 128 may include one or more inputs, for example, a first input configured to receive the priority level of packet 141, a second input configured to receive the priority level of packet 143, and/or a third input configured to receive the decision signal 232 (FIG. 2).

In some demonstrative embodiments, decision inverter 128 may invert the decision to indicate packet 141 is to be transmitted, e.g., instead of packet 143, for example, based at least on the first priorities of packets 141 and 143.

In some demonstrative embodiments, decision inverter 128 may include decision-inverting circuitry configured to invert the decision.

In some demonstrative embodiments, the at least one decision signal may include a first decision signal and a second decision signal.

In some demonstrative embodiments, the first decision signal may include a first value to indicate whether or not packet 143 is to be differed, and the second decision signal may include a second value to indicate whether or not packet 141 is to be differed, e.g., as described above.

In some demonstrative embodiments, decision inverter 128 may invert the decision of arbitration module 120, for example, by switching the first and second values between the first and second decision signals.

In one example, decision inverter 128 may invert the decision of arbitration module 120, for example, by switching the first and second values between signals 233 and 235 (FIG. 2)

In some demonstrative embodiments, decision inverter 128 may invert the decision of arbitration module 120, for example, responsive to a contention event indicating a contention between packets 141 and 143.

In some demonstrative embodiments, decision inverter 128 may invert the decision of arbitration module 120, for example, based at least on a Weighted Round Robin (WRR) arbitration scheme, e.g., as described below.

In some demonstrative embodiments, decision inverter 128 may invert the decision of arbitration module 120, for example, based at least on a pattern of swap decisions and/or a win ratio, e.g., as described below.

In some demonstrative embodiments, decision inverter 128 may invert the decision, for example, based at least on a pattern indicating a sequence of invert decisions corresponding to the first priorities of packets 141 and 143, e.g., as described below with reference to FIG. 4.

In some demonstrative embodiments, the pattern may include a sequence of bits corresponding to a sequence of contention events.

In some demonstrative embodiments, a bit of the bits may indicate whether or not to invert the decision for a respective contention event.

In some demonstrative embodiments, decision inverter 128 may select the pattern from a plurality of predefined patterns, for example, based at least on values of the first priorities of packet 141 and 143.

In some demonstrative embodiments, the plurality of predefined patterns may correspond to a respective plurality of different combinations of values of the first priorities of packets 141 and 143.

In some demonstrative embodiments, decision inverter 128 may select whether or not to invert the decision, for example, based at least on a win ratio corresponding to values of the first priorities of packets 141 and 143, e.g., as described below with reference to FIG. 5.

In some demonstrative embodiments, decision inverter 128 may select the win ratio from a plurality of win ratios, for example, based at least on the first priorities of packets 141 and 143.

In some demonstrative embodiments, the plurality of win ratios may correspond to a respective plurality of different combinations of values of the first priorities of packets 141 and 143.

In one example, the plurality of win ratios and/or the plurality of predefined patterns may correspond to a plurality of different combinations of values of the first priorities of packets 141 and 143, e.g., as follows:

TABLE 1

| Combination Number | Wi-Fi Priority (0: lowest 3: highest) | BT Priority (0: lowest 3: highest) | Static Arbitration Decision (0: BT wins 1: Wi-Fi wins) | Statistical lose to win ratio swap for Wi-Fi | Lose to win swap pattern (0: no swap, 1: swap) |
|---|---|---|---|---|---|
| 1 | 0 | 0 | 0 | 50% | 00001111 |
| 2 | 0 | 1 | 0 | 25% | 00000011 |
| 3 | 0 | 2 | 0 | 0% | 00000000 |
| 4 | 0 | 3 | 0 | 0% | 00000000 |
| 5 | 1 | 0 | 1 | NA | 00000000 |
| 6 | 1 | 1 | 0 | 50% | 00110011 |
| 7 | 1 | 2 | 0 | 25% | 00010001 |
| 8 | 1 | 3 | 0 | 0% | 00000000 |
| 9 | 2 | 0 | 1 | NA | 00000000 |
| 10 | 2 | 1 | 1 | NA | 00000000 |
| 11 | 2 | 2 | 0 | 50% | 00110011 |
| 12 | 2 | 3 | 0 | 25% | 00010001 |
| 13 | 3 | 0 | 1 | NA | 00000000 |
| 14 | 3 | 1 | 1 | NA | 00000000 |
| 15 | 3 | 2 | 1 | NA | 00000000 |
| 16 | 3 | 3 | 0 | 50% | 01010101 |

In one example, as shown in Table 1, the combination "7" may include a priority level of 1 for packet 143, and a priority level of 2 for packet 143.

According to the Combination "7", the decision of arbitration module 122 may indicate that packet 141, e.g., the packet of BT module 106, is to be transmitted.

In one example, decision inverter 128 may be configured to invert the decision of arbitration module 120, e.g., to indicate packet 143 is to be transmitted instead of packet 141, for example, at a win ratio of 25%, e.g., if arbitration module 122 inverts the decision based on the win ratio.

In another example, decision inverter 128 may be configured to invert the decision of arbitration module 120, e.g., to indicate packet 143 is to be transmitted instead of packet 141, for example, according to a pattern "00010001", for example, to invert only a fourth decision and an eighth decision of a sequence of eight decisions, e.g., if arbitration module 122 inverts the decision based on the predefined pattern.

In another example, as shown in Table 1, the combination "1" may include a priority level of 0 for packet 143, and a priority level of 0 for packet 143.

According to the Combination "1", the decision of arbitration module 122 may indicate that packet 141, e.g., the packet of BT module 106, is to be transmitted.

In one example, decision inverter 128 may be configured to invert the decision, e.g., to indicate packet 143 is to be transmitted instead of packet 141, for example, at a win ratio of 50%, for example, for every contention event, e.g., if arbitration module 122 inverts the decision based on the win ratio.

In another example, decision inverter 128 may be configured to invert the decision of arbitration module 120, e.g., to indicate packet 143 is to be transmitted instead of packet 141, for example, according to a pattern "00001111", for example, to enable four consecutive transmissions by the same module, e.g., if arbitration module 122 inverts the decision based on the predefined pattern.

In some demonstrative embodiments, the predefined pattern may enable one or more advantages, for example, compared to using the win ratio.

In some demonstrative embodiments, as shown in Table 1, different patterns may have the same win ratio. For example, the patterns of combinations "1" and "16" may have the same win ratio, e.g., 50%.

In some demonstrative embodiments, as shown in Table 1, different patterns, which have the same win ratio, may have a different sequence of decision bits.

In some demonstrative embodiments, setting and/or controlling the sequence of bits of a pattern, may enable to implement a pattern, which is suitable, e.g., most suitable, for example, to one or more priority levels, QoS and/or throughput time (TpT) requirements, which may be different for each level of QoS.

In one example, a VoIP application may be typically characterized by short packets, which are spaced regularly over a large repetition rate. Accordingly, a pattern of short repetitions, e.g., '01010101', may better fit the VoIP application. For example, this pattern may have a minimum latency in cases of contention, e.g., since the pattern may enable a re-transmission to succeed in a first attempt, for example, since the re-transmission has a high probability.

In another example, a video application, may transmit a large video frame, which may be fragmented to multiple packets. Accordingly, a pattern having a long sequence of successful transmissions within a video refresh rate interval may be most suitable. For example, the pattern of '00001111' may be more suitable, e.g., for the video application.

Figure 4:
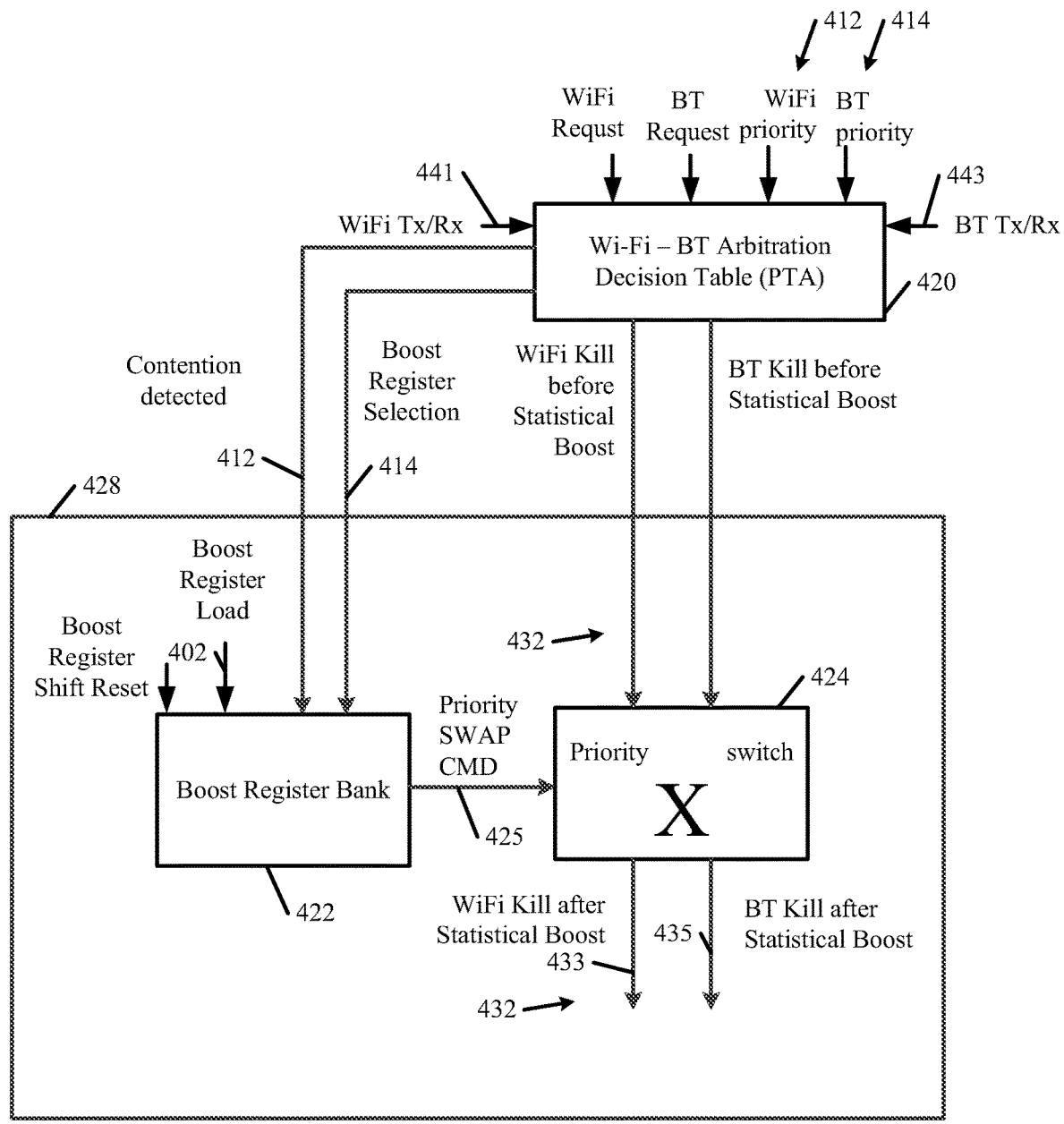
FIG. 4 is a schematic illustration of a decision inverter and an arbitration module, in accordance with some demonstrative embodiments.

Reference is made to FIG. 4, which schematically illustrates a decision inverter 428 and an arbitration module 420, in accordance with some demonstrative embodiments. For example, arbitration module 420 may perform the functionality of arbitration module 120 (FIG. 1), and/or decision inverter 428 may perform the functionality of decision inverter 128 (FIG. 1).

In some demonstrative embodiments, as shown in FIG. 4, decision inverter 428 may invert values of at least one decision signal 432 of arbitration module 420, for example, based on a pattern 402, e.g., as described above.

As shown in FIG. 4, decision inverter 428 may include a swap commander 422 configured to send a command to a priority inverter 424 to controllably invert the values decision signal 432.

As shown in FIG. 4, arbitration module 420 may receive a first priority level 412 of a first packet 441, e.g., from applications 111 (FIG. 1).

As shown in FIG. 4, arbitration module 420 may receive a second priority level 414 of a second packet 443, e.g., from applications 111 (FIG. 1).

As shown in FIG. 4, arbitration module 420 may provide and/or send decision signal 432 indicating which packet of packets 441 and 443 is selected to be transmitted.

As shown in FIG. 4, the decision signal 432 may include a first decision signal 433 and a second decision signal 435.

In some demonstrative embodiments, the first decision signal 433 may include a first value to indicate whether or not the packet 441 is to be differed, e.g., killed and/or declined; and the second decision signal 435 may include a second value to indicate whether or not packet 443 is to be differed.

As shown in FIG. 4, swap commander 422 may receive the first priority level 412 and the second priority level 414, for example, from arbitration module 420.

In some demonstrative embodiments, swap commander 422 may select pattern 402, for example, based on the first priority level 412 and the second priority level 414, e.g., according to Table 1 and/or any other patterns.

In one example, swap commander 422 may select the pattern '01010101', for example, if the first and second priority levels 412 and 414 each include the priority level '3', e.g., the Combination "16" according to Table 1.

In some demonstrative embodiments, swap commander 422 may determine whether or not to invert the values of decision signal 432 of arbitration module 420, for example, based on the selected pattern.

As shown in FIG. 4, swap commander 422 may send command 425 to priority inverter 424 to indicate to priority inverter 424 whether or not to invert the values of decision signal 432, for example, based on pattern 402.

In some demonstrative embodiments, priority inverter 424 may invert the values of decision signal 432 of priority inverter 420, for example, by switching the first and second values between decision signals 433 and 435.

Figure 5:
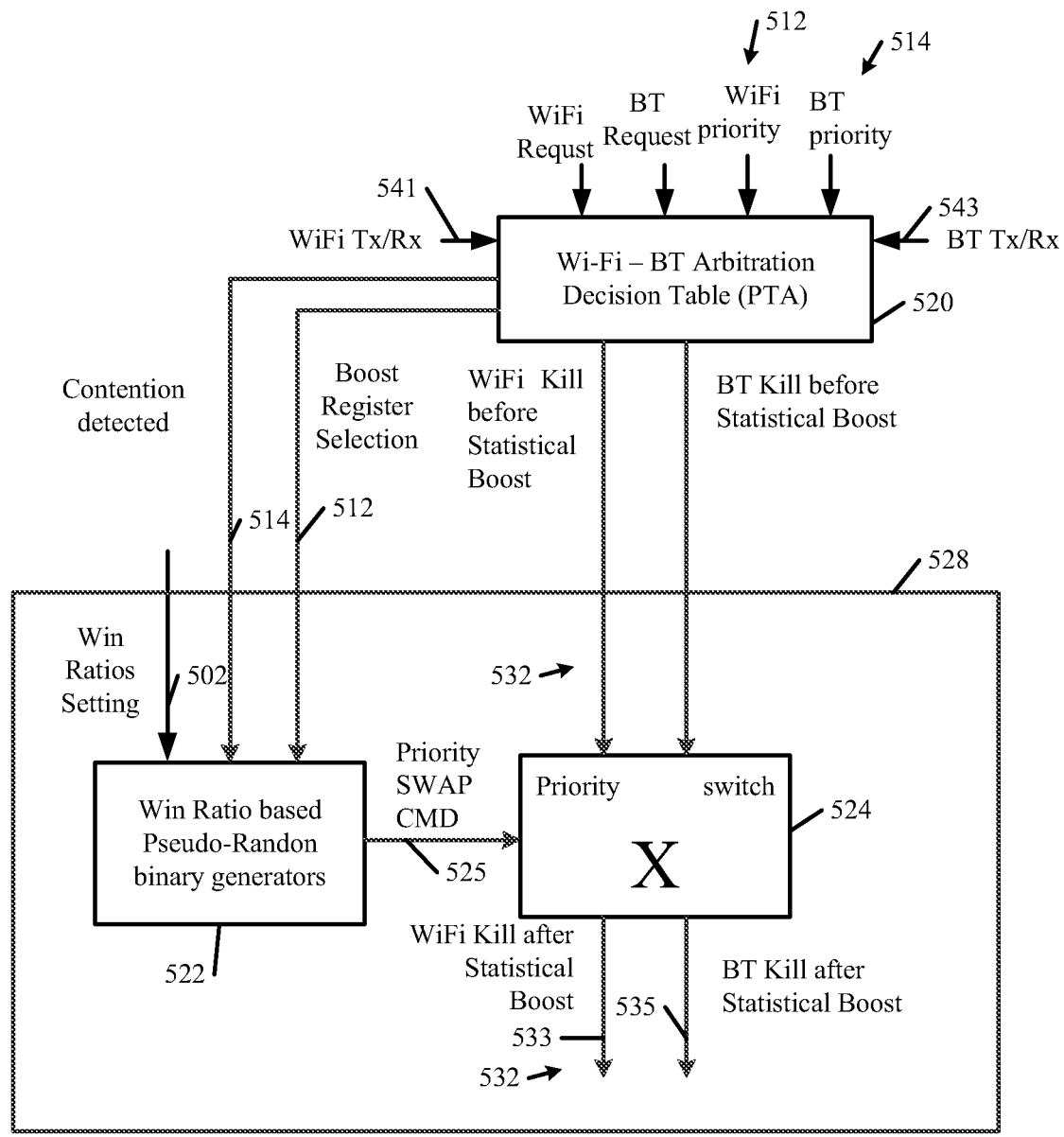
FIG. 5 is a schematic illustration of a decision inverter and an arbitration module, in accordance with some demonstrative embodiments.

Reference is made to FIG. 5, which schematically illustrates a decision inverter 528 and an arbitration module 520, in accordance with some demonstrative embodiments. For example, arbitration module 520 may perform the functionality of arbitration module 120 (FIG. 1), and/or decision inverter 528 may perform the functionality of decision inverter 128 (FIG. 1).

In some demonstrative embodiments, as shown in FIG. 5, decision inverter 528 may controllably invert values of decision signals 532 of arbitration module 520, for example, based on a win ratio 502, e.g., as described above.

As shown in FIG. 5, decision inverter 528 may include a swap commander 522 configured to send a command 525 to command a priority inverter 524 to invert the values of decision signal 532.

As shown in FIG. 5, arbitration module 520 may receive a first priority level 512 of a first packet 541, e.g., from applications 111 (FIG. 1).

As shown in FIG. 5, arbitration module 520 may receive a second priority level 514 of a second packet 543, e.g., from applications 111 (FIG. 1).

As shown in FIG. 5, arbitration module 520 may provide and/or send decision signal 532 indicating which packet of packets 541 and 543 is selected to be transmitted.

As shown in FIG. 5, the decision signal 532 may include a first decision signal 533 and a second decision signal 535.

In some demonstrative embodiments, the first decision signal 533 may include a first value to indicate whether or not the packet 541 is to be differed, e.g., killed and/or declined; and the second decision signal 535 may include a second value to indicate whether or not packet 543 is to be differed.

As shown in FIG. 5, swap commander 522 may receive the first priority level 512 and the second priority level 514, e.g., from arbitration module 520.

In some demonstrative embodiments, swap commander 522 may select win ratio 502, for example, based at least on the first priority level 512 and the second priority level 514, e.g., according to Table and/or any other criteria.

In one example, swap commander 522 may select the win ratio of 50%, for example, if each of the first and second priority levels 512 and 514 include the priority level '3', e.g., the Combination "16" according to Table 1.

In some demonstrative embodiments, swap commander 522 may determine whether or not to invert the values of decision signal 532 of arbitration module 520, for example, based on the selected win ratio 502.

As shown in FIG. 5, swap commander 522 may send a command 525 to priority inverter 524 to indicate whether or not to invert the decision 532, for example, based on the selected win ratio 502.

In some demonstrative embodiments, priority inverter 524 may invert the decision 532 of priority inverter 520, for example, by switching the first and second values between signals 533 and 535.

Figure 6:
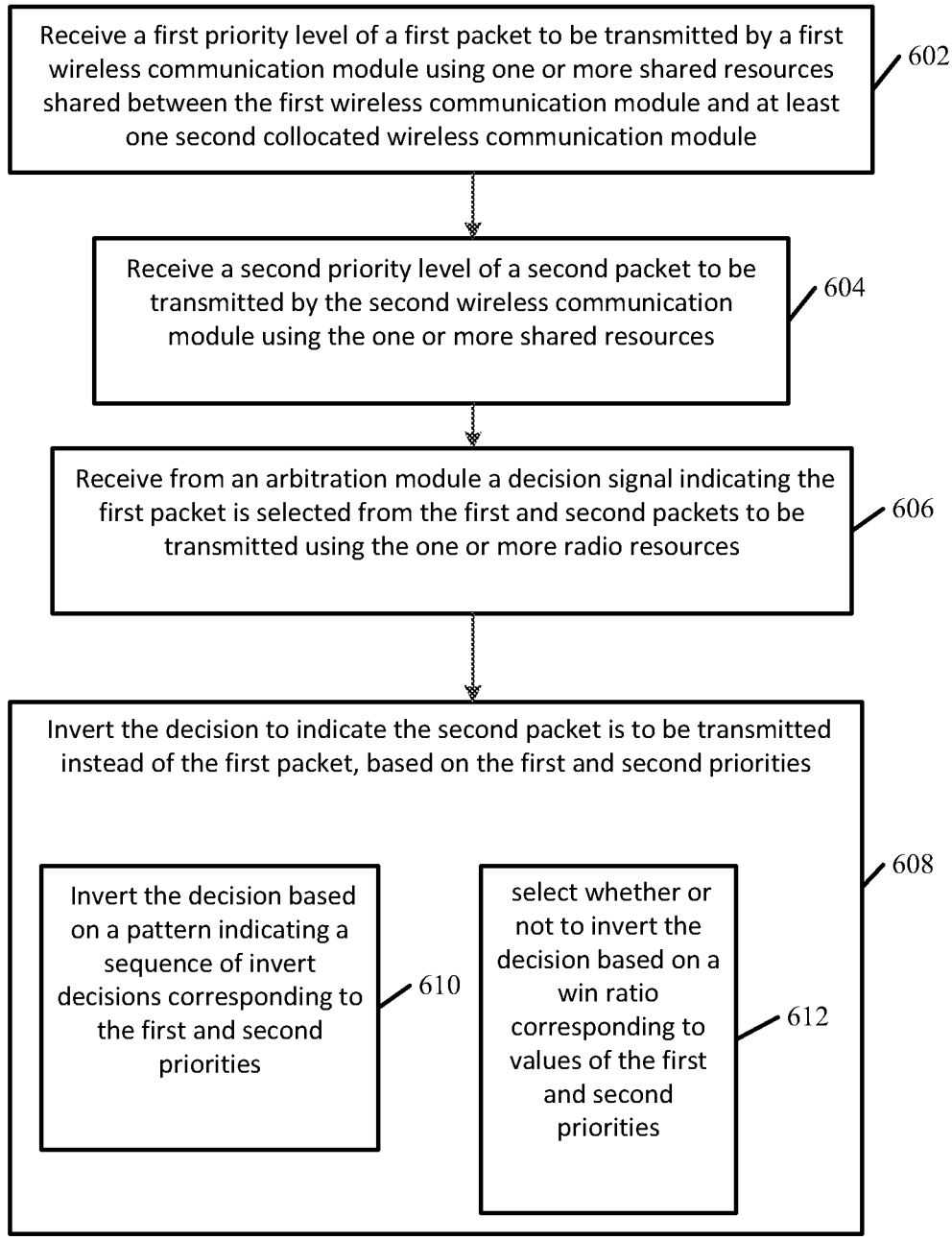
FIG. 6 is a schematic flow-chart illustration of a method of inverting a decision of an arbitration module, in accordance with some demonstrative embodiments.

Reference is made to FIG. 6, which schematically illustrates a method of inverting a decision of an arbitration module, in accordance with some demonstrative embodiments. In some demonstrative embodiments, one or more of the operations of the method of FIG. 6 may be performed by one or more elements of a system, e.g., system 100 (FIG. 1), a wireless communication device, e.g., wireless communication device 102 (FIG. 1), a decision inverter, e.g., decision inverter 128 (FIG. 1).

As indicated at block 602, the method may include receiving a first priority level of a first packet to be transmitted by a first wireless communication module using one or more shared resources shared between the first wireless communication module and at least one second co-located wireless communication module. For example, decision inverter 128 (FIG. 1) may receive the priority level of packet 141 (FIG. 1) to be transmitted by module 106 (FIG. 1) using one or more shared resources 122 (FIG. 1) shared between modules 106 and 108 (FIG. 1); decision inverter 428 (FIG. 4) may receive priority level 412 (FIG. 4) of packet 441 (FIG. 4) to be transmitted by module 106 (FIG. 1) using one or more shared resources 122 (FIG. 1) shared between modules 106 and 108 (FIG. 1); and/or decision inverter 528 (FIG. 5) may receive priority level 512 (FIG. 5) of packet 541 (FIG. 5) to be transmitted by module 106 (FIG. 1) using one or more shared resources 122 (FIG. 1), e.g., as described above.

As indicated at block 604, the method may include receiving a second priority level of a second packet to be transmitted by the second wireless communication module using the one or more shared resources. For example, decision inverter 128 (FIG. 1) may receive the priority level of packet 143 (FIG. 1) to be transmitted by module 108

(FIG. 1) using one or more shared resources 122 (FIG. 1) shared between modules 106 and 108 (FIG. 1); decision inverter 428 (FIG. 4) may receive priority level 414 (FIG. 4) of packet 443 (FIG. 4) to be transmitted by module 108 (FIG. 1) using one or more shared resources 122 (FIG. 1) shared between modules 106 and 108 (FIG. 1); and/or decision inverter 528 (FIG. 5) may receive priority level 514 (FIG. 5) of packet 543 (FIG. 5) to be transmitted by module 108 (FIG. 1) using one or more shared resources 122 (FIG. 1), e.g., as described above.

As indicated at block 606, the method may include receiving from an arbitration module a decision signal indicating the first packet is selected from the first and second packets to be transmitted using the one or more radio resources. For example, decision inverter 128 (FIG. 1) may receive from arbitration module 120 (FIG. 1) the decision signal indicating first packet 141 (FIG. 1) is selected from the packets 141 and 143 (FIG. 1) to be transmitted by shared resources 122 (FIG. 1); decision inverter 428 (FIG. 4) may receive from arbitration module 420 (FIG. 4) the decision signal 432 (FIG. 4) indicating first packet 441 (FIG. 4) is selected from the packets 441 and 443 (FIG. 4); and/or decision inverter 528 (FIG. 5) may receive from arbitration module 520 (FIG. 5) the decision signal 532 (FIG. 5) indicating first packet 541 (FIG. 5) is selected from the packets 541 and 543 (FIG. 5), e.g., as described above.

As indicated at block 608, the method may include inverting the decision to indicate the second packet is to be transmitted instead of the first packet, based on the first and second priorities. For example, decision inverter 128 (FIG. 1) may invert the decision to indicate packet 143 (FIG. 1) is to be transmitted instead of packet 141 (FIG. 1), for example, based on the priorities of packets 141 and 143 (FIG. 1); decision inverter 428 (FIG. 4) may invert decision 432 (FIG. 4) to indicate packet 443 (FIG. 4) is to be transmitted instead of packet 441 (FIG. 4), for example, based on priorities 412 and 414 (FIG. 4); and/or decision inverter 528 (FIG. 5) may invert decision 532 (FIG. 4) to indicate packet 543 (FIG. 5) is to be transmitted instead of packet 541 (FIG. 5), for example, based on priorities 512 and 514 (FIG. 5), e.g., as described above.

As indicated at block 610, inverting the decision may include inverting the decision based on a pattern indicating a sequence of invert decisions corresponding to the first and second priorities. For example, decision inverter 428 (FIG. 4) may invert decision 432 (FIG. 4) based on pattern 402 (FIG. 4), e.g., as described above.

As indicated at block 610, inverting the decision may include selecting whether or not to invert the decision based on a win ratio corresponding to values of the first and second priorities. For example, decision inverter 528 (FIG. 5) may invert decision 532 (FIG. 5) based on win ratio 502 (FIG. 5), e.g., as described above.

Figure 7:
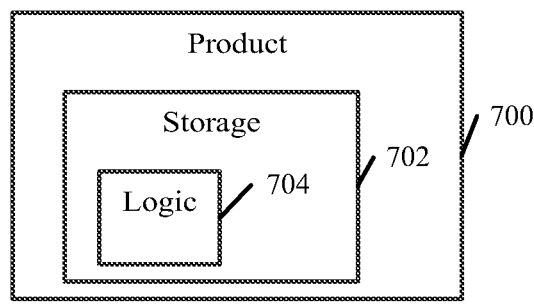
FIG. 7 is a schematic illustration of a product of manufacture, in accordance with some demonstrative embodiments.

Reference is made to FIG. 7, which schematically illustrates a product of manufacture 700, in accordance with some demonstrative embodiments. Product 700 may include a non-transitory machine-readable storage medium 702 to store logic 704, which may be used, for example, to perform at least part of the functionality of wireless communication device 102, priority increaser 128 (FIG. 1), priority increaser 228 (FIG. 2), decision inverter 128 (FIG. 1), decision inverter 428 (FIG. 4), decision inverter 528 (FIG. 5), and/or to perform one or more of the operations of the methods of FIG. 3 and/or FIG. 6. The phrase "non-transitory machine-readable medium" is directed to include all computer-readable media, with the sole exception being a transitory propagating signal.

In some demonstrative embodiments, product 700 and/or machine-readable storage medium 702 may include one or more types of computer-readable storage media capable of storing data, including volatile memory, non-volatile memory, removable or non-removable memory, erasable or non-erasable memory, writeable or re-writeable memory, and the like. For example, machine-readable storage medium 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 704 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a product comprising one or more tangible computer-readable non-transitory storage media comprising computer-executable instructions operable to, when executed by at least one computer processor, enable the at least one computer processor to implement one or more operations, the operations comprising receiving a latency attribute indicating an allowed latency to transmit a packet using one or more shared resources shared between a plurality of wireless communication modules; receiving a first priority level indicating a first transmission priority of the packet; increasing the first priority level to a second priority level based on a comparison between the allowed latency and a time from reception of the latency attribute;

and sending the second priority level to an arbitration module, wherein the second priority level indicates to the arbitration module a second transmission priority to transmit the packet using the one or more shared resources.

Example 2 includes the subject matter of Example 1, and optionally, wherein the latency attribute comprises a Requested Max Latency (RML) attribute to indicate a maximal latency to transmit the packet.

Example 3 includes the subject matter of Example 1 or 2, and optionally, wherein the operations comprise setting a timer to count down from the allowed latency, and increasing the first priority level based on a value of the timer.

Example 4 includes the subject matter of any one of Examples 1-3, and optionally, wherein the operations comprise increasing the priority level based on a comparison between a predefined threshold and a difference between the allowed latency and the time from reception of the latency attribute.

Example 5 includes the subject matter of any one of Examples 1-4, and optionally, wherein the first and second priority levels comprise quality of service (QoS) levels.

Example 6 includes the subject matter of any one of Examples 1-4, and optionally, wherein the first and second priority levels comprise Bluetooth profiles.

Example 7 includes the subject matter of any one of Examples 1-6, and optionally, wherein the plurality of wireless communication modules comprise first and second different modules selected from the group consisting of a Bluetooth (BT) module, a Wireless Local Area Network (WLAN) module, and a Long Term Evolution (LTE) module.

Example 8 includes an apparatus of wireless communication, the apparatus comprising circuitry configured to receive a first priority level of a first packet to be transmitted by a first wireless communication module using one or more shared resources shared between the first wireless communication module and at least one second collocated wireless communication module; receive a second priority level of a second packet to be transmitted by the second wireless communication module using the one or more shared resources; receive from an arbitration module a decision signal indicating the first packet is selected from the first and second packets to be transmitted using the one or more shared resources; and based on the first and second priorities, invert the decision to indicate the second packet is to be transmitted instead of the first packet.

Example 9 includes the subject matter of Example 8, and optionally, comprising a first input configured to receive the first priority level; a second input configured to receive the second priority level; a third input configured to receive the decision signal; and decision-inverting circuitry configured to invert the decision.

Example 10 includes the subject matter of Example 8 or 9, and optionally, wherein the decision signal comprises a first signal and a second signal, the first signal comprising a first value to indicate whether or not the first packet is to be differed, and the second signal comprising a second value to indicate whether or not the second packet is to be differed, the apparatus is configured to invert the decision by switching the first and second values between the first and second signals.

Example 11 includes the subject matter of any one of Examples 8-10, and optionally, being configured to invert the decision based on a pattern indicating a sequence of invert decisions corresponding to the first and second priorities.

Example 12 includes the subject matter of Example 11, and optionally, wherein the pattern comprises a sequence of bits corresponding to a sequence of contention events, a bit of the bits indicating whether or not to invert the decision for a respective contention event.

Example 13 includes the subject matter of Example 11 or 12, and optionally, being configured to select the pattern from a plurality of predefined patterns based on values of the first and second priority levels, the plurality of predefined patterns corresponding to a respective plurality of different combinations of values of the first and second priority levels.

Example 14 includes the subject matter of any one of Examples 8-10, and optionally, being configured to select whether or not to invert the decision based on a win ratio corresponding to values of the first and second priorities.

Example 15 includes the subject matter of Example 14, and optionally, being configured to select the win ratio from a plurality of win rations based on the first and second priority levels, the plurality of win rations corresponding to a respective plurality of different combinations of values of the first and second priority levels.

Example 16 includes the subject matter of any one of Examples 8-15, and optionally, being configured to invert the decision based on a Weighted Round Robin (WRR) arbitration scheme.

Example 17 includes the subject matter of any one of Examples 8-16, and optionally, being configured to invert the decision responsive to a contention event indicating a contention between the first and second packets.

Example 18 includes the subject matter of any one of Examples 8-17, and optionally, wherein the first and second priority levels comprise quality of service (QoS) levels.

Example 19 includes the subject matter of any one of Examples 8-17, and optionally, wherein the first and second priority levels comprise Bluetooth profiles.

Example 20 includes the subject matter of any one of Examples 8-19, and optionally, wherein the plurality of wireless communication modules comprise first and second different modules selected from the group consisting of a Bluetooth (BT) module, a Wireless Local Area Network (WLAN) module, and a Long Term Evolution (LTE) module.

Example 21 includes the subject matter of any one of Examples 8-20, and optionally, comprising one or more radios; one or more antennas; a memory; and a processor.

Example 22 includes a wireless communication device comprising a plurality of wireless communication modules; and a priority increaser configured to receive a latency attribute indicating an allowed latency to transmit a packet using one or more shared resources shared between the plurality of wireless communication modules; configured to receive a first priority level indicating a first transmission priority of the packet; configured to increase the first priority level to a second priority level based on a comparison between the allowed latency and a time from reception of the latency attribute; and configured to send the second priority level to an arbitration module, wherein the second priority level indicates to the arbitration module a second transmission priority to transmit the packet using the one or more shared resources.

Example 23 includes the subject matter of Example 22, and optionally, wherein the latency attribute comprises a Requested Max Latency (RML) attribute to indicate a maximal latency to transmit the packet.

Example 24 includes the subject matter of Example 22 or 23, and optionally, wherein the priority increaser is configured to set a timer to count down from the allowed latency, and configured to increase the first priority level based on a value of the timer.

Example 25 includes the subject matter of any one of Examples 22-24, and optionally, wherein the priority increaser is configured to increase the priority level based on a comparison between a predefined threshold and a difference between the allowed latency and the time from reception of the latency attribute.

Example 26 includes the subject matter of any one of Examples 22-25, and optionally, wherein the first and second priority levels comprise quality of service (QoS) levels.

Example 27 includes the subject matter of any one of Examples 22-25, and optionally, wherein the first and second priority levels comprise Bluetooth profiles.

Example 28 includes the subject matter of any one of Examples 22-27, and optionally, wherein the plurality of wireless communication modules comprise first and second different modules selected from the group consisting of a Bluetooth (BT) module, a Wireless Local Area Network (WLAN) module, and a Long Term Evolution (LTE) module.

Example 29 includes the subject matter of any one of Examples 22-28, and optionally, comprising one or more antennas, a memory and a processor.

Example 30 includes a method of wireless communication, the method comprising receiving a latency attribute indicating an allowed latency to transmit a packet using one or more shared resources shared between a plurality of wireless communication modules; receiving a first priority level indicating a first transmission priority of the packet; increasing the first priority level to a second priority level based on a comparison between the allowed latency and a time from reception of the latency attribute; and sending the second priority level to an arbitration module, the second priority level to indicate to the arbitration module a second transmission priority to transmit the packet using the one or more shared resources.

Example 31 includes the subject matter of Example 30, and optionally, wherein the latency attribute comprises a Requested Max Latency (RML) attribute to indicate a maximal latency to transmit the packet.

Example 32 includes the subject matter of Example 30 or 31, and optionally, comprising setting a timer to count down from the allowed latency, and increasing the first priority level based on a value of the timer.

Example 33 includes the subject matter of any one of Examples 30-32, and optionally, comprising increasing the priority level based on a comparison between a predefined threshold and a difference between the allowed latency and the time from reception of the latency attribute.

Example 34 includes the subject matter of any one of Examples 30-33, and optionally, wherein the first and second priority levels comprise quality of service (QoS) levels.

Example 35 includes the subject matter of any one of Examples 30-33, and optionally, wherein the first and second priority levels comprise Bluetooth profiles.

Example 36 includes the subject matter of any one of Examples 30-35, and optionally, wherein the plurality of wireless communication modules comprise first and second different modules selected from the group consisting of a Bluetooth (BT) module, a Wireless Local Area Network (WLAN) module, and a Long Term Evolution (LTE) module.

Example 37 includes an apparatus of wireless communication, the apparatus comprising means for receiving a latency attribute indicating an allowed latency to transmit a packet using one or more shared resources shared between a plurality of wireless communication modules; means for receiving a first priority level indicating a first transmission priority of the packet; means for increasing the first priority level to a second priority level based on a comparison between the allowed latency and a time from reception of the latency attribute; and means for sending the second priority level to an arbitration module, the second priority level to indicate to the arbitration module a second transmission priority to transmit the packet using the one or more shared resources.

Example 38 includes the subject matter of Example 37, and optionally, wherein the latency attribute comprises a Requested Max Latency (RML) attribute to indicate a maximal latency to transmit the packet.

Example 39 includes the subject matter of Example 37 or 38, and optionally, comprising means for setting a timer to count down from the allowed latency, and increasing the first priority level based on a value of the timer.

Example 40 includes the subject matter of any one of Examples 37-39, and optionally, comprising means for increasing the priority level based on a comparison between a predefined threshold and a difference between the allowed latency and the time from reception of the latency attribute.

Example 41 includes the subject matter of any one of Examples 37-40, and optionally, wherein the first and second priority levels comprise quality of service (QoS) levels.

Example 42 includes the subject matter of any one of Examples 37-40, and optionally, wherein the first and second priority levels comprise Bluetooth profiles.

Example 43 includes the subject matter of any one of Examples 37-42, and optionally, wherein the plurality of wireless communication modules comprise first and second different modules selected from the group consisting of a Bluetooth (BT) module, a Wireless Local Area Network (WLAN) module, and a Long Term Evolution (LTE) module.

Example 44 includes a wireless communication device comprising a plurality of wireless communication modules; and a decision inverter configured to receive a first priority level of a first packet to be transmitted by a first wireless communication module using one or more shared resources shared between the first wireless communication module and a second wireless communication module; configured to receive a second priority level of a second packet to be transmitted by the second wireless communication module using the one or more shared resources; configured to receive from an arbitration module a decision signal indicating the first packet is selected from the first and second packets to be transmitted using the one or more shared resources; and configured to, based on the first and second priorities, invert the decision to indicate the second packet is to be transmitted instead of the first packet.

Example 45 includes the subject matter of Example 44, and optionally, wherein the decision signal comprises a first signal and a second signal, the first signal comprising a first value to indicate whether or not the first packet is to be differed, and the second signal comprising a second value to indicate whether or not the second packet is to be differed, wherein the decision inverter is configured to invert the decision by switching the first and second values between the first and second signals.

Example 46 includes the subject matter of Example 44 or 45, and optionally, wherein the decision inverter is configured to invert the decision based on a pattern indicating a sequence of invert decisions corresponding to the first and second priorities.

Example 47 includes the subject matter of Example 46, and optionally, wherein the pattern comprises a sequence of bits corresponding to a sequence of contention events, a bit of the bits indicating whether or not to invert the decision for a respective contention event.

Example 48 includes the subject matter of Example 46 or 47, and optionally, wherein the decision inverter is configured to select the pattern from a plurality of predefined patterns based on values of the first and second priority levels, the plurality of predefined patterns corresponding to a respective plurality of different combinations of values of the first and second priority levels.

Example 49 includes the subject matter of Example 44, and optionally, wherein the decision inverter is configured to select whether or not to invert the decision based on a win ratio corresponding to values of the first and second priorities.

Example 50 includes the subject matter of Example 49, and optionally, wherein the decision inverter is configured to select the win ratio from a plurality of win rations based on the first and second priority levels, the plurality of win rations corresponding to a respective plurality of different combinations of values of the first and second priority levels.

Example 51 includes the subject matter of any one of Examples 44-50, and optionally, wherein the decision inverter is configured to invert the decision based on a Weighted Round Robin (WRR) arbitration scheme.

Example 52 includes the subject matter of any one of Examples 44-51, and optionally, wherein the decision inverter is configured to invert the decision responsive to a contention event indicating a contention between the first and second packets.

Example 53 includes the subject matter of any one of Examples 44-52, and optionally, wherein the first and second priority levels comprise quality of service (QoS) levels.

Example 54 includes the subject matter of any one of Examples 44-52, and optionally, wherein the first and second priority levels comprise Bluetooth profiles.

Example 55 includes the subject matter of any one of Examples 44-54, and optionally, wherein the plurality of wireless communication modules comprise first and second different modules selected from the group consisting of a Bluetooth (BT) module, a Wireless Local Area Network (WLAN) module, and a Long Term Evolution (LTE) module.

Example 56 includes the subject matter of any one of Examples 44-55, and optionally, comprising one or more radios; one or more antennas; a memory; and a processor.

Example 57 includes a method of wireless communication, the method comprising receiving a first priority level of a first packet to be transmitted by a first wireless communication module using one or more shared resources shared between the first wireless communication module and at least one second collocated wireless communication module; receiving a second priority level of a second packet to be transmitted by the second wireless communication module using the one or more shared resources; receiving from an arbitration module a decision signal indicating the first packet is selected from the first and second packets to be transmitted using the one or more shared resources; and based on the first and second priorities, inverting the decision to indicate the second packet is to be transmitted instead of the first packet.

Example 58 includes the subject matter of Example 57, and optionally, wherein the decision signal comprises a first signal and a second signal, the first signal comprising a first value to indicate whether or not the first packet is to be differed, and the second signal comprising a second value to indicate whether or not the second packet is to be differed, the method comprising inverting the decision by switching the first and second values between the first and second signals.

Example 59 includes the subject matter of Example 57 or 58, and optionally, comprising inverting the decision based on a pattern indicating a sequence of invert decisions corresponding to the first and second priorities.

Example 60 includes the subject matter of Example 59, and optionally, wherein the pattern comprises a sequence of bits corresponding to a sequence of contention events, a bit of the bits indicating whether or not to invert the decision for a respective contention event.

Example 61 includes the subject matter of Example 59 or 60, and optionally, comprising selecting the pattern from a plurality of predefined patterns based on values of the first and second priority levels, the plurality of predefined patterns corresponding to a respective plurality of different combinations of values of the first and second priority levels.

Example 62 includes the subject matter of Example 57, and optionally, comprising selecting whether or not to invert the decision based on a win ratio corresponding to values of the first and second priorities.

Example 63 includes the subject matter of Example 62, and optionally, comprising selecting the win ratio from a plurality of win rations based on the first and second priority levels, the plurality of win rations corresponding to a respective plurality of different combinations of values of the first and second priority levels.

Example 64 includes the subject matter of any one of Examples 57-63, and optionally, comprising inverting the decision based on a Weighted Round Robin (WRR) arbitration scheme.

Example 65 includes the subject matter of any one of Examples 57-64, and optionally, comprising inverting the decision responsive to a contention event indicating a contention between the first and second packets.

Example 66 includes the subject matter of any one of Examples 57-65, and optionally, wherein the first and second priority levels comprise quality of service (QoS) levels.

Example 67 includes the subject matter of any one of Examples 57-65, and optionally, wherein the first and second priority levels comprise Bluetooth profiles.

Example 68 includes the subject matter of any one of Examples 57-67, and optionally, wherein the first and second wireless communication modules comprise first and second respective different modules selected from the group consisting of a Bluetooth (BT) module, a Wireless Local Area Network (WLAN) module, and a Long Term Evolution (LTE) module.

Example 69 includes a product comprising one or more tangible computer-readable non-transitory storage media comprising computer-executable instructions operable to, when executed by at least one computer processor, enable the at least one computer processor to implement one or more operations, the operations comprising receiving a first priority level of a first packet to be transmitted by a first wireless communication module using one or more shared resources shared between the first wireless communication module and at least one second collocated wireless communication module; receiving a second priority level of a second packet to be transmitted by the second wireless communication module using the one or more shared resources; receiving from an arbitration module a decision signal indicating the first packet is selected from the first and second packets to be transmitted using the one or more shared resources; and based on the first and second priorities, inverting the decision to indicate the second packet is to be transmitted instead of the first packet.

Example 70 includes the subject matter of Example 69, and optionally, wherein the decision signal comprises a first signal and a second signal, the first signal comprising a first value to indicate whether or not the first packet is to be differed, and the second signal comprising a second value to indicate whether or not the second packet is to be differed, the operations comprise inverting the decision by switching the first and second values between the first and second signals.

Example 71 includes the subject matter of Example 69 or 70, and optionally, wherein the operations comprise inverting the decision based on a pattern indicating a sequence of invert decisions corresponding to the first and second priorities.

Example 72 includes the subject matter of Example 71, and optionally, wherein the pattern comprises a sequence of bits corresponding to a sequence of contention events, a bit of the bits indicating whether or not to invert the decision for a respective contention event.

Example 73 includes the subject matter of Example 71 or 72, and optionally, wherein the operations comprise selecting the pattern from a plurality of predefined patterns based on values of the first and second priority levels, the plurality of predefined patterns corresponding to a respective plurality of different combinations of values of the first and second priority levels.

Example 74 includes the subject matter of Example 69, and optionally, wherein the operations comprise selecting whether or not to invert the decision based on a win ratio corresponding to values of the first and second priorities.

Example 75 includes the subject matter of Example 74, and optionally, wherein the operations comprise selecting the win ratio from a plurality of win rations based on the first and second priority levels, the plurality of win rations corresponding to a respective plurality of different combinations of values of the first and second priority levels.

Example 76 includes the subject matter of any one of Examples 69-75, and optionally, wherein the operations comprise inverting the decision based on a Weighted Round Robin (WRR) arbitration scheme.

Example 77 includes the subject matter of any one of Examples 69-76, and optionally, wherein the operations comprise inverting the decision responsive to a contention event indicating a contention between the first and second packets.

Example 78 includes the subject matter of any one of Examples 69-77, and optionally, wherein the first and second priority levels comprise quality of service (QoS) levels.

Example 79 includes the subject matter of any one of Examples 69-77, and optionally, wherein the first and second priority levels comprise Bluetooth profiles.

Example 80 includes the subject matter of any one of Examples 69-79, and optionally, wherein the first and second wireless communication modules comprise first and second respective different modules selected from the group consisting of a Bluetooth (BT) module, a Wireless Local Area Network (WLAN) module, and a Long Term Evolution (LTE) module.

Example 81 includes an apparatus of wireless communication, the apparatus comprising means for receiving a first priority level of a first packet to be transmitted by a first wireless communication module using one or more shared resources shared between the first wireless communication module and at least one second collocated wireless communication module; means for receiving a second priority level of a second packet to be transmitted by the second wireless communication module using the one or more shared resources; means for receiving from an arbitration module a decision signal indicating the first packet is selected from the first and second packets to be transmitted using the one or more shared resources; and means for, based on the first and second priorities, inverting the decision to indicate the second packet is to be transmitted instead of the first packet.

Example 82 includes the subject matter of Example 81, and optionally, wherein the decision signal comprises a first signal and a second signal, the first signal comprising a first value to indicate whether or not the first packet is to be differed, and the second signal comprising a second value to indicate whether or not the second packet is to be differed, the apparatus comprising means for inverting the decision by switching the first and second values between the first and second signals.

Example 83 includes the subject matter of Example 81 or 82, and optionally, comprising means for inverting the decision based on a pattern indicating a sequence of invert decisions corresponding to the first and second priorities.

Example 84 includes the subject matter of Example 83, and optionally, wherein the pattern comprises a sequence of bits corresponding to a sequence of contention events, a bit of the bits indicating whether or not to invert the decision for a respective contention event.

Example 85 includes the subject matter of Example 83 or 84, and optionally, comprising means for selecting the pattern from a plurality of predefined patterns based on values of the first and second priority levels, the plurality of predefined patterns corresponding to a respective plurality of different combinations of values of the first and second priority levels.

Example 86 includes the subject matter of Example 81, and optionally, comprising means for selecting whether or not to invert the decision based on a win ratio corresponding to values of the first and second priorities.

Example 87 includes the subject matter of Example 86, and optionally, comprising means for selecting the win ratio from a plurality of win rations based on the first and second priority levels, the plurality of win rations corresponding to a respective plurality of different combinations of values of the first and second priority levels.

Example 88 includes the subject matter of any one of Examples 81-87, and optionally, comprising means for inverting the decision based on a Weighted Round Robin (WRR) arbitration scheme.

Example 89 includes the subject matter of any one of Examples 81-88, and optionally, comprising means for inverting the decision responsive to a contention event indicating a contention between the first and second packets.

Example 90 includes the subject matter of any one of Examples 81-89, and optionally, wherein the first and second priority levels comprise quality of service (QoS) levels.

Example 91 includes the subject matter of any one of Examples 81-89, and optionally, wherein the first and second priority levels comprise Bluetooth profiles.

Example 92 includes the subject matter of any one of Examples 81-91, and optionally, wherein the first and second wireless communication modules comprise first and second respective different modules selected from the group consisting of a Bluetooth (BT) module, a Wireless Local Area Network (WLAN) module, and a Long Term Evolution (LTE) module.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising circuitry configured to:
receive a first priority level of a first packet to be transmitted by first wireless communication circuitry using one or more shared resources shared between the first wireless communication circuitry and second collocated wireless communication circuitry;
receive a second priority level of a second packet to be transmitted by the second wireless communication circuitry using the one or more shared resources;
receive from an arbitrator a decision signal indicating am arbitration decision, the arbitration decision to indicate that the first packet is selected from the first and second packets to be transmitted using the one or more shared resources; and
based on the first and second priority levels, invert the arbitration decision into an inverted arbitration decision, the inverted arbitration decision to indicate that the second packet is to be transmitted instead of the first packet.

2. The apparatus of claim 1 comprising:
a first input configured to receive the first priority level;
a second input configured to receive the second priority level;
a third input configured to receive the decision signal; and
decision-inverting circuitry configured to invert the arbitration decision into the inverted arbitration decision.

3. The apparatus of claim 1, wherein the decision signal comprises a first signal and a second signal, the first signal comprising a first value to indicate whether or not the first packet is to be deferred, and the second signal comprising a second value to indicate whether or not the second packet is to be deferred, the apparatus is configured to invert the arbitration decision into the inverted arbitration decision by switching the first and second values between the first and second signals.

4. The apparatus of claim 1 configured to invert the arbitration decision into the inverted arbitration decision based on a pattern indicating a sequence of invert decisions corresponding to the first and second priority levels.

5. The apparatus of claim 4, wherein the pattern comprises a sequence of bits corresponding to a sequence of contention events, a bit of the bits indicating whether or not to invert the arbitration decision for a respective contention event.

6. The apparatus of claim 4 configured to select the pattern from a plurality of predefined patterns based on values of the first and second priority levels, the plurality of predefined patterns corresponding to a respective plurality of different combinations of values of the first and second priority levels.

7. The apparatus of claim 1 configured to select whether or not to invert the arbitration decision into the inverted arbitration decision based on a win ratio corresponding to values of the first and second priority levels.

8. The apparatus of claim 7 configured to select the win ratio from a plurality of win ratios based on the first and second priority levels, the plurality of win ratios corresponding to a respective plurality of different combinations of values of the first and second priority levels.

9. The apparatus of claim 1 configured to invert the arbitration decision into the inverted arbitration decision based on a Weighted Round Robin (WRR) arbitration scheme.

10. The apparatus of claim 1 configured to invert the arbitration decision into the inverted arbitration decision based on a contention event indicating a contention between the first and second packets.

11. The apparatus of claim 1, wherein the first and second priority levels comprise quality of service (QoS) levels.

12. The apparatus of claim 1, wherein the first and second priority levels comprise Bluetooth profiles.

13. The apparatus of claim 1, wherein the first and second wireless communication circuitry comprise first and second different circuitry selected from the group consisting of Bluetooth (BT) circuitry, Wireless Local Area Network (WLAN) circuitry, and Long Term Evolution (LTE) circuitry.

14. The apparatus of claim 1 comprising:
one or more radios;
one or more antennas;
a memory; and
a processor.

15. A product comprising one or more tangible computer-readable non-transitory storage media comprising computer-executable instructions operable to, when executed by at least one processor, enable the at least one processor to cause a decision inverter of a wireless communication device to:
receive a first priority level of a first packet to be transmitted by first wireless communication circuitry of the wireless communication device using one or more shared resources shared between the first wireless communication circuitry and second collocated wireless communication circuitry of the wireless communication device;
receive a second priority level of a second packet to be transmitted by the second wireless communication circuitry using the one or more shared resources;
receive from an arbitrator a decision signal indicating an arbitration decision, the arbitration decision to indicate that the first packet is selected from the first and second packets to be transmitted using the one or more shared resources; and
based on the first and second priority levels, invert the arbitration decision into an inverted arbitration decision, the inverted arbitration decision to indicate that the second packet is to be transmitted instead of the first packet.

16. The product of claim 15, wherein the decision signal comprises a first signal and a second signal, the first signal comprising a first value to indicate whether or not the first packet is to be deferred, and the second signal comprising a second value to indicate whether or not the second packet is to be deferred, the instructions, when executed, cause the decision inverter to invert the arbitration decision into the inverted arbitration decision by switching the first and second values between the first and second signals.

17. The product of claim 15, wherein the instructions, when executed, cause the decision inverter to invert the arbitration decision into the inverted arbitration decision based on a pattern indicating a sequence of invert decisions corresponding to the first and second priority levels.

18. The product of claim 15, wherein the instructions, when executed, cause the decision inverter to select whether or not to invert the arbitration decision into the inverted arbitration decision based on a win ratio corresponding to values of the first and second priority levels.

19. The product of claim 15, wherein the instructions, when executed, cause the decision inverter to invert the arbitration decision into the inverted arbitration decision based on a Weighted Round Robin (WRR) arbitration scheme.

20. The product of claim 15, wherein the instructions, when executed, cause the decision inverter to invert the arbitration decision into the inverted arbitration decision based on a contention event indicating a contention between the first and second packets.

* * * * *